United States Patent
Schweinhart et al.

(10) Patent No.: US 6,961,539 B2
(45) Date of Patent: Nov. 1, 2005

(54) LOW LATENCY HANDLING OF TRANSMISSION CONTROL PROTOCOL MESSAGES IN A BROADBAND SATELLITE COMMUNICATIONS SYSTEM

(75) Inventors: Craig Schweinhart, Rockville, MD (US); Patrick Stevens, Eldersburg, MD (US); Suresh Iyer, Germantown, MD (US); Mangala Kannan, Potomac, MD (US); William Walsh, Anaheim Hills, CA (US); Mark Abinante, Inglewood, CA (US)

(73) Assignee: Hughes Electronics Corporation, El Segundo, CA (US)

(*) Notice: Subject to any disclaimer, the term of this patent is extended or adjusted under 35 U.S.C. 154(b) by 765 days.

(21) Appl. No.: 09/925,178

(22) Filed: Aug. 9, 2001

(65) Prior Publication Data

US 2003/0032391 A1 Feb. 13, 2003

(51) Int. Cl.[7] ............................................. H04B 7/185
(52) U.S. Cl. ................. 455/12.1; 455/13.1; 370/229; 370/310; 370/389; 709/249; 709/223
(58) Field of Search ................. 455/12.1, 13.1; 709/249, 223; 370/229, 389, 310

(56) References Cited

U.S. PATENT DOCUMENTS

| | | | |
|---|---|---|---|
| 6,754,210 B1 * | 6/2004 | Ofek | 370/389 |
| 2002/0031086 A1 * | 3/2002 | Welin | 370/229 |
| 2002/0099854 A1 * | 7/2002 | Jorgensen | 709/249 |
| 2002/0105965 A1 * | 8/2002 | Draviola et al. | 370/463 |

* cited by examiner

Primary Examiner—Nick Corsaro
Assistant Examiner—Alan T. Gantt
(74) Attorney, Agent, or Firm—Craig Plastrik

(57) ABSTRACT

An approach for transmitting packets conforming with the TCP (Transmission Control Protocol) over a satellite communications network comprises a plurality of prioritized queues that are configured to store the packets. The packets conform with a predetermined protocol. A classification logic classifies the packets based upon the predetermined protocol. The packet is selectively stored in one of the plurality of queues, wherein the one queue is of a relatively high priority. The packet is scheduled for transmission over the satellite communications network according to the relative priority of the one queue.

55 Claims, 10 Drawing Sheets

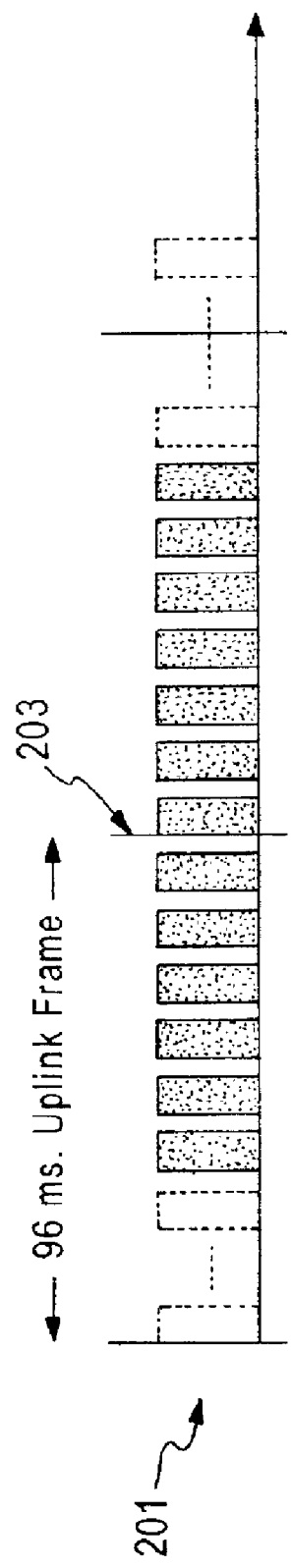
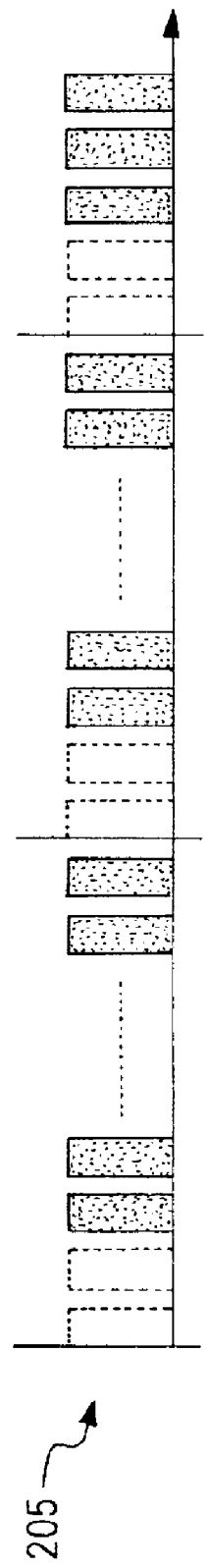
FIG. 2A
FIG. 2B

LOW LATENCY HANDLING OF TRANSMISSION CONTROL PROTOCOL MESSAGES IN A BROADBAND SATELLITE COMMUNICATIONS SYSTEM

BACKGROUND OF THE INVENTION

1. Field of the Invention

The present invention relates generally to a broadband communication system, and is more particularly related to scheduling of packet transmission and queue servicing within a satellite terminal.

2. Discussion of the Background

As society, in general, become increasingly reliant on communication networks to conduct a variety of activities, ranging from business transactions to personal entertainment, communication engineers continually face the challenges of optimizing use of network capacity and ensuring network availability to a diverse set of users with varying traffic requirements. Because capacity requirements of different users, for that matter of the same users, can fluctuate depending on time day and applications, the accuracy of traffic forecasts is diminished. Inaccurate forecasts can lead to negative effects, such as traffic congestion, slow response times, or even loss data. The maturity of electronic commerce and acceptance of the Internet as a daily tool by millions of users (this user base continues to grow) only intensify the need to develop techniques to streamline capacity usage. With the advances in processing power of desktop computers, the average user has grown accustomed to sophisticated multimedia applications, which place tremendous strain on network resources (e.g., switch capacity). Also, because the decrease in application response times is a direct result of the increased processor performance, the user has grown less tolerant of network delays, demanding comparable improvements in the network infrastructure. Therefore, efficient use of network capacity is imperative, particularly in systems where capacity needs to be managed carefully, such as a satellite network.

Satellite communications systems have emerged as an accessible and reliable network infrastructure that can support the exchange of voice, video, and data traffic. Conventionally, these satellite communications systems offer dedicated communication channels that relay or tunnel traffic without processing such traffic (i.e., "bent pipe"). That is, the system has no knowledge of what types of protocols are used or data that is contained within the packets. One drawback with these satellite communications systems is that they are highly inefficient with respect to bandwidth allocation. For example, if the satellite has excess transponder bandwidth at a particular time, this excess capacity cannot be temporality reallocated to another satellite terminal (ST). Another drawback is that the satellite cannot perform any processing on the received traffic; thus, key networking functions, such as flow control and congestion control, are not available. Yet another drawback concerns the inflexibility of the system to adapt dynamically to the traffic requirements of the STs. Given the bursty nature of Internet traffic, traffic emanating from the STs can vary greatly, thereby making it technically impractical to adjust the static channel assignments of the traditional bent pipe satellite systems.

Further, the STs, as an entry point into the satellite network, need to buffer large amounts of traffic. This buffering is conventionally accomplished using static queues. Given the diversity of traffic type, coupled with data flows of varying priorities, the use of static queues can result in wasted memory as well as unnecessary dropping of packets.

As a further challenge in the design of satellite networks, communication engineers need to minimize the effects of the inherent propagation delays of a satellite network. This design consideration is particularly relevant in the transmission of Internet traffic; notably, web traffic. In a typical web transaction, an end user enters a URL (Uniform Resource Locator) in a web browser that is resident with the host computer of the user. This host computer then requests the specified URL from a remote web server, which returns an HTML page that contains numerous embedded objects (i.e., web content) to the web browser.

The exchange of information between the web browser and the web server is governed by the HTTP (Hyper Text Transfer Protocol), which is an application level protocol. Upon receiving the HTML page, the web browser parses the page to retrieve each embedded object. The retrieval process often requires the establishment of separate communication sessions (e.g., TCP (Transmission Control Protocol) sessions) to the web server. That is, after an embedded object is received, the TCP session is torn down and another TCP session is established for the next object. Because HTTP utilizes a separate TCP connection for each transaction, the large number of transactions amplifies the network delay.

Based on the foregoing, there is a clear need for improved approaches for expediting web traffic by managing queues within the terminals of a satellite communications system.

There is also a need to enhance efficient utilization of the system capacity.

There is also a need to reduce response time associated with web traffic.

There is a further need to dynamically adapt to bandwidth requirements of the satellite terminals.

Based on the need to improve system efficiency, an approach for expediting web traffic in a satellite network is highly desirable.

SUMMARY OF THE INVENTION

The present invention addresses the above stated needs by providing a capability within a satellite terminal to direct TCP traffic to a priority queue for expedited transmission.

The present invention relates to forwarding of TCP packets, such as web traffic, through a satellite communications network to minimize the impact on user response time. Upon receipt of TCP packets (e.g., HTTP messages), a satellite terminal classifies the packets and selectively applies compression, storing the compressed data into a queue with a high priority level. Accordingly, the TCP packets may be forwarded over contention channels or may pre-empt an allocated transmission slot. As a result, the TCP packets are expedited through the satellite communications network.

According to one aspect of the invention, a method of transmitting packets via a terminal over a satellite communications network. The method includes receiving a packet that conforms with a predetermined protocol, and classifying the packet based upon the predetermined protocol. The method also includes selectively storing the packet into one of a plurality of prioritized queues, wherein the one queue is of a relatively high priority. Further, the method includes scheduling the packet for transmission over the satellite communications network according to the storing step. Under this approach, the system throughput is enhanced.

According to another aspect of the invention, a terminal apparatus for transmitting packets over a satellite communications network comprises a plurality of queues configured to store the packets. The plurality of queues is prioritized. The packets conform with a predetermined protocol. A classification logic configured to classify the packets based upon the predetermined protocol. One of the packets is selectively stored in one of the plurality of queues, wherein the one queue is of a relatively high priority. The one packet is scheduled for transmission over the satellite communications network according to the relative priority of the one queue. This arrangement advantageously provides improvement in user response time, especially with respect to web traffic.

According to another aspect of the invention, a satellite communications system comprises a hub configured to control bandwidth allocations in conjunction with a satellite. A plurality of terminals is configured to transmit packets. Each of the terminals comprises a plurality of queues that are configured to store the packets; the plurality of queues is prioritized. Each of the terminals also includes a classification logic that is configured to classify one of the packets based upon a predetermined protocol associated with the one packet, wherein the one packet is selectively stored in one of the plurality of queues. The one queue is of a relatively high priority. The one packet is scheduled for transmission over the satellite communications network according to the relative priority of the one queue. The above arrangement advantageously provides efficient utilization of bandwidth.

In another aspect of the invention, a terminal apparatus for transmitting packets over a satellite communications network comprises means for receiving a packet that conforms with a predetermined protocol. The apparatus also includes means for classifying the packet based upon the predetermined protocol. Further, the apparatus includes means for selectively storing the packet into one of a plurality of prioritized queues, wherein the one queue is of a relatively high priority. The apparatus also includes means for scheduling the packet for transmission over the satellite communications network according to priority level of the one queue. The above arrangement advantageously enhances system throughput of web traffic.

In yet another aspect of the invention, a computer-readable medium carrying one or more sequences of one or more instructions for transmitting packets via a terminal over a satellite communications network is disclosed. The one or more sequences of one or more instructions include instructions which, when executed by one or more processors, cause the one or more processors to perform the step of receiving a packet that conforms with a predetermined protocol. Other steps include classifying the packet based upon the predetermined protocol and selectively storing the packet into one of a plurality of prioritized queues. The one queue is of a relatively high priority. Yet another step includes scheduling the packet for transmission over the satellite communications network according to the storing step. This approach advantageously improves servicing of user traffic.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 2A and 2B are diagrams of the bandwidth allocation operation, according to an embodiment of the present invention;

DESCRIPTION OF THE PREFERRED EMBODIMENTS

In the following description, for the purpose of explanation, specific details are set forth in order to provide a thorough understanding of the invention. However, it will be apparent that the invention may be practiced without these specific details. In some instances, well-known structures and devices are depicted in block diagram form in order to avoid unnecessarily obscuring the invention.

The present invention accomplishes dynamic management of queues within a satellite terminal. The satellite terminal includes a queue control logic that is configured to dynamically change depths of the plurality of queues according to a prescribed scheme. The prescribed scheme specifies new depths of the plurality of queues based upon past bandwidth allocations associated with the respective plurality of queues.

Although the present invention is described with respect to a satellite communications system that supports packet switching, it is recognized by one of ordinary skill in the art that the present invention has applicability to packet switching systems, in general.

Figure 1:
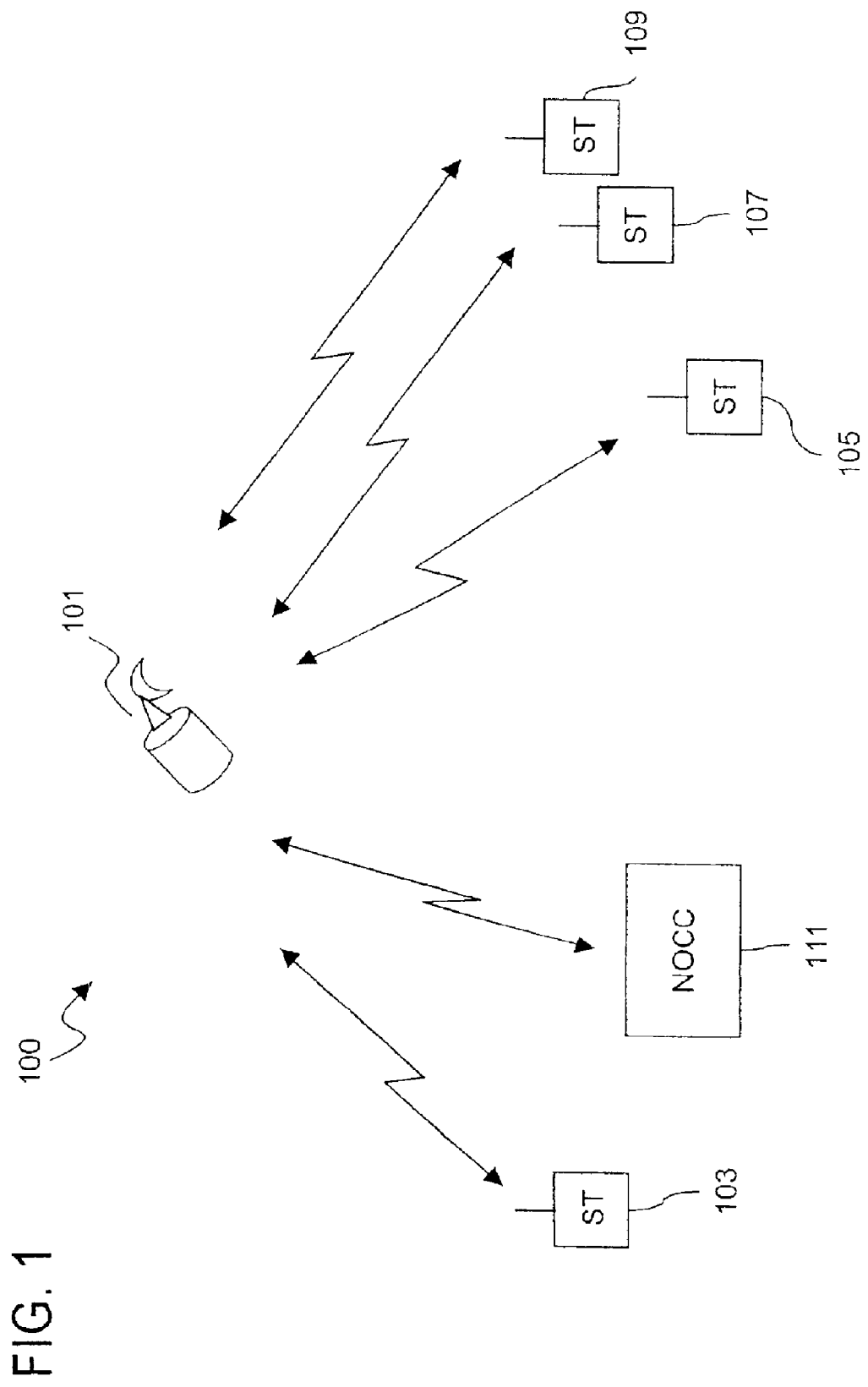
FIG. 1 is a block diagram of a satellite communications system supporting low latency handling of Transmission Control Protocol (TCP) messages, in accordance with an embodiment of the present invention.

FIG. 1 shows a block diagram of a satellite communications system supporting bandwidth-on-demand, in accordance with an embodiment of the present invention. Satellite communications system 100 supports LAN-to-LAN data exchange via a geosynchronous satellite 101. As shown, the system 100 provides an infrastructure that serves multiple enterprise networks, denoted Enterprise A and Enterprise B. The system 100 can simultaneously serve many logically separate networks with different topologies and applications. In this example, enterprise network A has numerous Ethernet-based LANs (local area networks) 103, 105, 107, and 109, which maintain connectivity with the satellite 101 using satellite terminals (STs) 111, 113, 115, and 117, respectively. In an exemplary embodiment, the STs 111, 113, 115, and 117 are Very Small Aperture (VSAT) terminals, and can transmit data at rates up to 16 Mbps (as will be more fully discussed later). Under this architecture, users can communicate from one VSAT (ST) to another directly with one satellite hop. That is, the system 100 provides mesh connectivity.

With respect to enterprise A, in addition to connectivity via satellite 101, LANs 103 and 105 are connected through routers 119 and 121, respectively, to a common terrestrial data network 119. In an exemplary embodiment, the system 100 is designed to transport Internet Protocol (IP) based traffic. LAN 107 contains a router 125 that resides behind a firewall 127 for connectivity to the Internet 129.

Satellite 101, according to this example, also supports Enterprise B, which contains multiple LANs 131, 133, 135, and 137. LAN 135 connects to the Internet 129 via a firewall 139 and a router 141. STs 143, 145, 147, and 149 provide connectivity to the satellite 101 for LANs 131, 133, 135, and 137, respectively.

Unlike conventional bent-pipe satellite systems, satellite 101 demodulates fixed-length packets that are received from STs on uplink spot beams, queues the packets for the proper downlink destination based on packet header information, and then modulates the packets for transmission on the specified downlink spot beam. Satellite 101 employs spot beams and possesses processing functions that permit greater power and spectral efficiency than traditional bent-pipe satellites. Further, satellite 101 can replicate individual packets that are received on the uplink and send these packets to multiple downlink spot beam destinations. In this manner, satellite 101 can retain broad distribution capabilities of the bent-pipe satellite systems, while providing flexibility in terms of bandwidth allocations.

Satellite 101 can address single uplink packets to a broadcast downlink beam that allows all of the STs (e.g., 111, 113, 115, 117, 143, 145, 147, and 149) within the broadcast coverage area to receive the packets. Satellite 101 can be configured to vary the amount of packet throughput capacity that is dedicated to the broadcast downlink beam versus individual smaller downlink beams. For instance, one packet sent to the broadcast beam displaces 36 packets sent to individual downlink beams. Thus, the ability to selectively allocate the satellites' broadcast beam compared to spot capacities (e.g., by time-of-day or based on traffic demand) allows the system 100 to be constantly optimized for maximum capacity (or revenue).

FIG. 1 show a block diagram of a satellite communications system capable of supporting contention channels, in accordance with an embodiment of the present invention. A communication system 100 includes a satellite 101 that supports communication among satellite terminals (STs) 103, 105, 107, and 109. System 100 employs Network Operations Control Center (NOCC) 109 to manage and control communication services and operations. For example, the NOCC 109 provisions and identifies the channels that are to be used for the various packet delivery services, which are supported by the system 100. These packet delivery services are more fully described below.

In an exemplary embodiment, the STs 103, 105, 107, and 109 are Very Small Aperture (VSAT) terminals. Under this architecture, users can communicate from one VSAT ST to another directly with one satellite hop. That is, the system 100 provides mesh connectivity. According to one embodiment of the present invention, system 100 possesses a centralized reservation mechanism for providing bandwidth on demand (BoD). Because BoD request rate may be limited, the present invention act to offload the centralized reservation mechanism by handling low data rate flows.

Unlike conventional bent-pipe satellite systems, satellite 101 demodulates fixed-length packets that are received from STs on uplink spot beams, queues the packets for the proper downlink destination based on packet header information, and then modulates the packets for transmission on the specified downlink spot beam. Satellite 101 employs spot beams and possesses processing functions that permit greater power and spectral efficiency than traditional bent-pipe satellites. Further, satellite 101 can replicate individual packets that are received on the uplink and send these packets to multiple downlink spot beam destinations. In this manner, satellite 101 can retain broad distribution capabilities of the bent-pipe satellite systems, while providing flexibility in terms of bandwidth allocations.

Satellite 101 contains a fast packet switch (FPS) (not shown) to process data packets that are exchanged across system 100. Exemplary switches include an ATM (Asynchronous Transfer Mode) switch, and a Gigabit Ethernet switch; it is recognized by one of ordinary skill in the art that any type of switch can be utilized. The FPS transfers the packets that the payload of the satellite 101 receives on the uplinks to the proper downlinks. The payloads of satellite 101 may include other components, such as uplink antenna, down-converters, switch matrix, demodulator banks, and phased-array downlink antenna; these other components are well known, and thus, are not described in detail.

The satellite 101 performs the necessary bandwidth control functions, in conjunction with the Network Operations Control Center (NOCC) 111 (i.e., a hub). In system 100, STs 103, 105, 107, and 109 originate traffic from a particular coverage area and may transmit connectionless traffic as well as connection-oriented traffic. The generated traffic from these STs 103, 105, 107, and 109 are transferred through switch and terminate at destination STs (not shown) within the same and/or different coverage area. That is, the destination STs can be within the same coverage area as the originating STs. To effectively transmit traffic to the desired destination ST through the switch of the satellite 101, STs 103, 105, 107, and 109 transmit bandwidth requests to the satellite 101 prior to transmitting any data traffic.

A connection that is established between a source ST and a destination ST is controlled by the satellite 101 and the NOCC 111. The NOCC 111, which is based on the ground, provides management functions for the system 100. For example, an ST needs to obtain authorization from the NOCC 111 before making a request to the satellite 101. The NOCC 111 keeps track of the total uplink (and downlink) bandwidth available for connections and will block a connection request if there is insufficient satellite capacity available to satisfy the request.

The satellite 101 implements the bandwidth control function, which includes controlling the allocation of uplink channels and timeslots and mitigating downlink congestion. Satellite 101 examines the requested bandwidth and replies with grants based on downlink resource availability, as determined by a congestion avoidance logic (not shown) and uplink resource availability. The congestion avoidance logic regulates the amount of traffic received by the switch through, for example, TDMA (Time Division Multiple Access)/FDMA (Frequency Division Multiple Access) uplink channels via request/grant bandwidth control processes.

According to one embodiment of the present invention, two types of requests are defined: rate requests, and volume requests. As will be detailed later, these requests are delivery services in support of transport services. In general, rate requests are utilized for connection-oriented traffic, while volume requests are used to transmit bursty traffic. The present invention has particular application to volume requests. STs 103, 105, 107, and 109, in general, can submit rate requests as well as volume requests, depending on the mode of operation (i.e., the type of traffic the ST is processing). Rate requests specify the number of slots in each uplink frame that an ST (e.g. 103) needs to meet the uplink demands for a relatively constant traffic (e.g., connection-oriented). A rate request results in the allocation of a constant number of slots each frame, spread out as evenly in time as possible, which the ST (e.g. 103) can use to send packets at a constant rate. The requesting ST (e.g. 103) gets a constant allocation of that uplink capacity every frame until the request is cancelled by the ST (e.g. 103) via a de-allocation message to the satellite.

Volume requests specify the number of uplink slots that an ST (e.g. 103) requires to send a specific number of packets to another ST (e.g. 103). The requesting ST (e.g. 103) receives a periodic allocation of one or many slots within a specific frame until the entire number of slots requested has been allocated. Volume requests are used by the ST (e.g. 103) to send a burst (one or many) of data packets on the uplink. Several volume requests may be transmitted by the ST (e.g. 103) in a short period of time to send a file that has hundreds of data packets (e.g., segmented IP (Internet Protocol) packets) to another ST (e.g. 105, 107, and 109).

The bandwidth request operation is performed by an ST (e.g. 103) that transmits data using a rate request during one session and a volume request during another session. A satellite terminal transmits a bandwidth request message to the satellite over a contention channel. Based on the current traffic load, the satellite 101 may dynamically assign some of the uplink channels on a frame-by-frame basis to change the designation of these uplink channels from data channels to contention channels. Thus, when the traffic on the data channels is light, the satellite 101 can assign most of the data channels to be used as contention channels, thereby reducing the collision rate for contention accesses by the STs. In other words, as traffic on data channels increases, the satellite 101 can change contention channels into data channels, as appropriate. This advantageously permits a more efficient use of satellite capacity, in that as the load increases, fewer channels are dedicated to receiving new bandwidth request messages.

Upon receiving the bandwidth request message and after determining that bandwidth is available, the satellite 101 sends a rate allocation every frame to provide the ST (e.g. 103) with a fixed number of time slots that the ST (e.g. 103) can transmit into that frame. Specifically, the satellite 101 allocates uplink slots in response to bandwidth requests from STs in each uplink beam once every frame and sends rate allocations to the STs in these downlink cells once per frame using allocation messages. Sending rate allocations every frame allows the satellite 101 to move rate allocation slots within a channel or to another channel to "defragment" the rate allocations.

According to one embodiment, the satellite 101 packs allocations for several STs into each allocation message to preserve downlink bandwidth. The satellite 101 addresses allocation messages to a dedicated multicast group address so that these packets can be processed by all of the STs in the uplink cell that are waiting for slot allocations. These STs process every allocation message that they receive to find the ones that contain their own destination addresses and their corresponding allocations.

Rate requests, according to an embodiment of the present invention, are acknowledged by the satellite 101 in one of two ways, rate allocation within an allocation message or rate denied within an acknowledgement message. As used herein, the term assignment messages refer to both allocation messages and acknowledgement messages; an acknowledgement message effectively is a denial of the request (i.e., no slots have been allocated). If an ST (e.g. 103) receives a request denied response to a rate request, the ST (e.g. 103) notifies the NOCC 111, which then determines the course of action. Rate requests are de-allocated (released) by the ST (e.g. 103) when the ST (e.g. 103) has completed its transmission. Rate de-allocated messages from the ST (e.g. 103) are not acknowledged by the satellite 101. The ST (e.g. 103) monitors the multicast allocation message from the satellite 101 to determine that the rate was de-allocated. The NOCC 111 can also de-allocate a rate request for an ST (e.g. 103).

The size of rate requests can be increased or decreased by sending a rate change request specifying a different number of slots per frame. The change request is sent using an allocation from the original rate request. If the rate change is granted, the ST (e.g. 103) receives an allocation for the new rate within a multicast allocation message. If the rate change is denied, the ST (e.g. 103) receives a multicast acknowledgement message indicating the denial. The satellite 101 does not de-allocate the original rate request until the satellite 101 has successfully processed and allocated the changed rate request.

An ST (e.g. 103) that does not receive a multicast packet with its allocation (due to a rain fade, etc.) cannot transmit. The ST (e.g. 103) must wait until a multicast is received that specifies the allocation to resume transmission.

Successive rate allocations provide the ST (e.g. 103) with the same number of time slots in a frame; however, the channel and slot locations for that allocation may be changed. Upon receiving the rate allocation, the ST (e.g. 103) can begin transmitting data. Thus, an ST (e.g. 103) may send a packet burst into a timeslot on a data channel only if the ST (e.g. 103) has sent a request message to the satellite 101 and has received an allocation from the satellite 101 authorizing the ST (e.g. 103) use of specific timeslots on a particular channel. It should be noted that the data channels experience no collisions because the satellite 101 only allocates a timeslot on a data channels to a single ST (e.g. 103). The rate allocation remains until the ST (e.g. 103) sends a bandwidth release packet. Initial bandwidth requests for a rate allocation are typically sent on a contention channel. However, the release packet, which de-allocates a rate, can be sent within the rate allocation that is being de-allocated.

FIGS. 2A and 2B show examples of volume allocations from the satellite 101 in the system 100. A volume allocation gives an ST (e.g., 103, 105, 107, and 109) permission to transmit into specified timeslots on a specified channel. STs request volume allocations when they have a specific number of data packets that the STs seek to deliver. Diagram 201 shows that the ST has been allocated 13 bursts in contiguous timeslots on a specified channel. The allocations straddle an uplink frame boundary 203.

With respect to diagram 205 of FIG. 2B, the ST has been allocated timeslots in three consecutive frames. There is a rate allocation (shown in white) to another ST on this channel, so the volume allocation (shown in black) is interspersed with the rate allocation over multiple frames.

Figure 3:
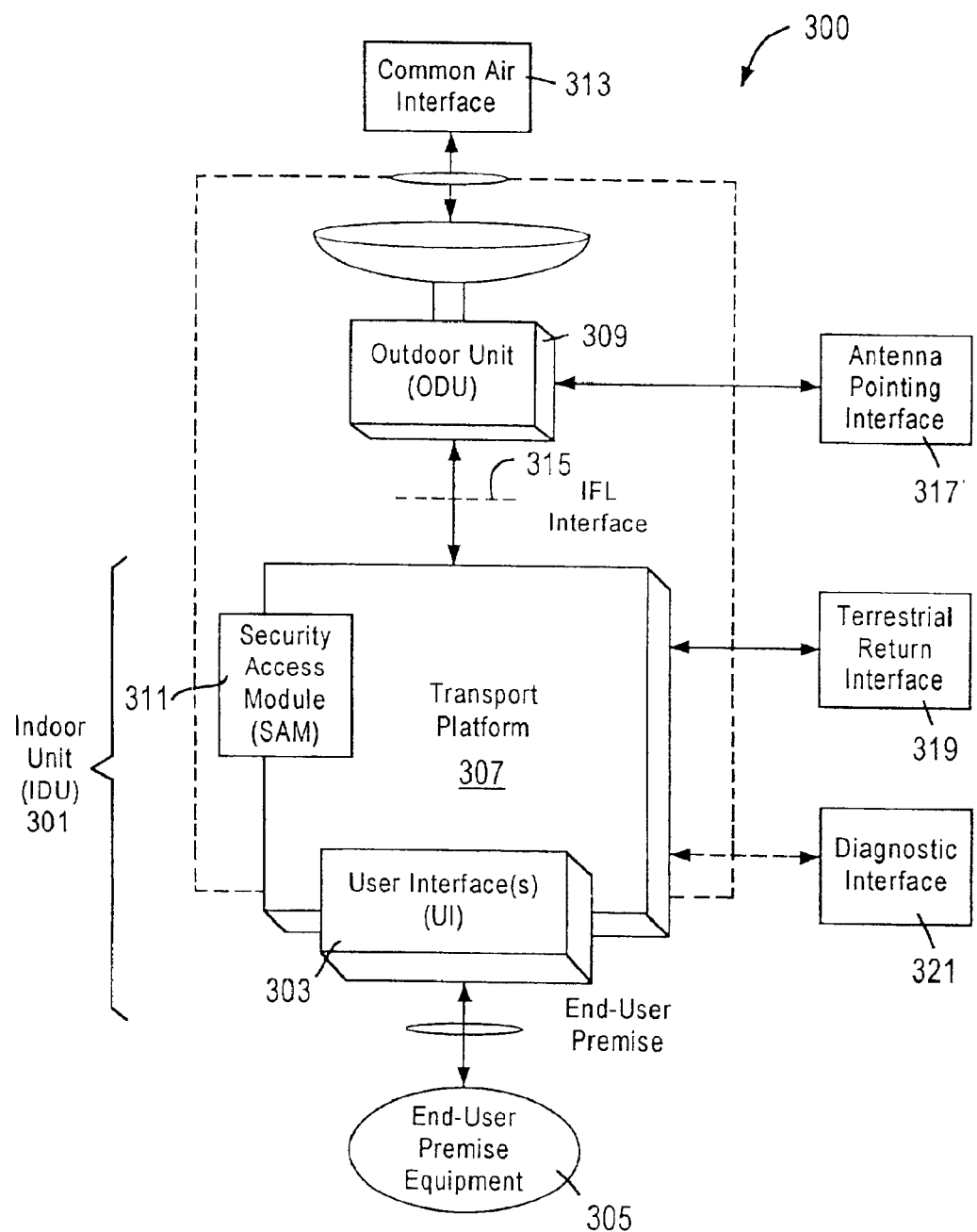
FIG. 3 is a block diagram of a Satellite Terminal (ST) utilized in the system of FIG. 1.

FIG. 3 shows a block diagram of a Satellite Terminal (ST) utilized in the system of FIG. 1. ST 300 has a layered functional architecture, which includes two functional elements: a core Transport Platform (TP) 301 and one or more application specific User Interfaces (UI) 303. The TP 307 is the functional element that provides the basic communications services including the physical, network and management layers. The TP 307 is generic in the sense that diverse end user applications can be accommodated without change to the TP 307. The UI 301 is the functional element that provides the interface between the TP 307 and an end user equipment 305. The UI 301 provides any adaptation necessary such that the end user applications can be communicated over system 100.

The ST 300 includes the following components: an Indoor Unit (IDU) 301, an Outdoor Unit (ODU) 309, a Security Access Module (SAM) 311, and User Interface (UI) 303. The IDU 301 unit is installed indoors and typically includes such components (not shown) as an uplink modulator, downlink demodulator, data packet handler, terminal control subsystem, power supply and chassis. The ODU 309, which is installed outdoors, includes a small antenna, antenna feed, RF transmitter, high power amplifier (HPA), and IF (Intermediate Frequency) conversion functions.

The SAM unit 311 provides security functions, including authentication, network access control, key management and network signaling encryption. In an exemplary embodiment, the SAM 311 is a replaceable module that is installed as part of the IDU 301.

The UI unit 303 provides the user interface and adaptation function that allows users to connect the End-User premise equipment 305 to the system 100. The UI 303 may be implemented as a plug in module or be built into the IDU 301, depending on the ST type.

Further, ST 300 has a number of interfaces: a Common Air Interface (CAI) 313, an Inter-Facility Link (IFL) 315, an Antenna Pointing Interface 317, a Terrestrial Return Interface 319, a Diagnostic Interface 321, and UI 303. ST 300 complies with the common air interface 313, which includes all aspects of the physical, link, network and management layers that defines the interface between the ST 300 and the system 100. The inter facility link (IFL) 315 is an internal interface that connects the IDU 301 and ODU 309. The IFL 315, according to an exemplary embodiment, consists of standard coaxial cables.

The user interface 303 defines the nature of a specific application process and the manner by which the application is adapted to system 100. According to an embodiment of the present invention, the UI 303 is an Ethernet interface (e.g., 10BaseT, 100BaseT, etc.). It is recognized by one of ordinary skill in the art that any number of user interfaces may be utilized.

The antenna pointing interface 317 permits the end-user to steer the antenna towards satellite 101 to obtain proper signal strength. That is, the ST 300 provides an indicator that is accessible at the ODU 309 for use in pointing the antenna to the proper satellite 101. The pointing indicator provides feedback that reflects the relative received signal quality; the antenna position is adjusted until the peak signal quality is achieved.

Via the Terrestrial Return Interface 319, ST 300 supports a terrestrial return capability for terminals that do not have satellite transmission capability. This interface 319 may use, for example, an internal dial-up modem that supports data rates up to 56 kbps, along with the necessary interface logic to connect to a public switched telephone network (PSTN).

Diagnostic interface 321 is used for field service application; such as, testing by the field technician. The end-user does not have access to this interface 321, which is protected against unauthorized usage. This interface 321 may be an asynchronous serial port that supports data rates up to 19.2 kbps.

Several ST types exist, and are categorized based upon the particular application. End-User Satellite Terminals (ESTs) are complete terminals with all the necessary interworking functions to interface with End-User Premises Equipment 305 (e.g., an individual personal computer or a business local area network (LAN)). STs may also be Network Satellite Terminals (NSTs), which are complete terminals with all the necessary interworking functions to interface with the network infrastructure of, for instance, an enterprise customer (e.g. network access nodes for Internet backbone), as discussed in FIG. 1. NSTs are well suited to large businesses, corporate headquarters, and Internet Services Provider (ISP) applications. The NOCC 111 also uses STs for internal network operations and management; such STs are termed System Satellite Terminals (SSTs). As used herein, the term "ST" refers to any one of the above ST types.

In an exemplary embodiment, as discussed earlier, ST 300 supports the "A" frequency band from 29.5 to 30 GHz for the uplink. The uplink frequency band has an aggregate spectrum of 500 MHz contained within the uplink Ka-band. ST 300 uses Frequency Division Multiplexed (FDM) uplink carriers that represent the smallest assignable portion of continuous spectrum within the uplink frequency band. According to one embodiment of the present invention, a number of FDM carrier burst rates are supported (e.g., 128 kbps, 512 kbps, 2 Mbps and 16 Mbps) depending on the ST type.

ST 300 uses Time Division Multiple Access (TDMA) on each uplink FDM carrier. This access technique allows multiple STs to share an uplink FDM carrier. The unit of transmission on the uplink is a TDMA burst. Each TDMA burst includes a start guard time, a unique word, a traffic segment and an end guard time. The traffic segment contains uplink code blocks, which are made up of two one hundred and eight byte packets and a four byte Access Control Field. ST 300 provides Forward Error Correction (FEC) encoding for the uplink code blocks.

As indicated previously, ST 300 supports two types of packet delivery services: connection-oriented packet delivery service (i.e., rate), and connectionless packet delivery service (i.e., volume). ST 300 sends packets to one or more STs at a fixed rate. ST 300 supports both scheduled and on-demand connections in response to user interface signaling. The scheduled connections are based on configuration from the NOCC 111 that provides information such as when the connection is to be established, the duration of the connection, the needed bandwidth, priority, etc. The connection setup requires first the NOCC 111 admission control and then the payload bandwidth allocation before packets can be sent.

For connectionless service, ST 300 sends a burst of packets to one or more STs. The ST requests from the satellite 101 the number of packets that it wants to send (volume request). The connectionless setup requires only the bandwidth allocation by the satellite 101 before packets can be sent (i.e., no NOCC admission control).

Figure 4:
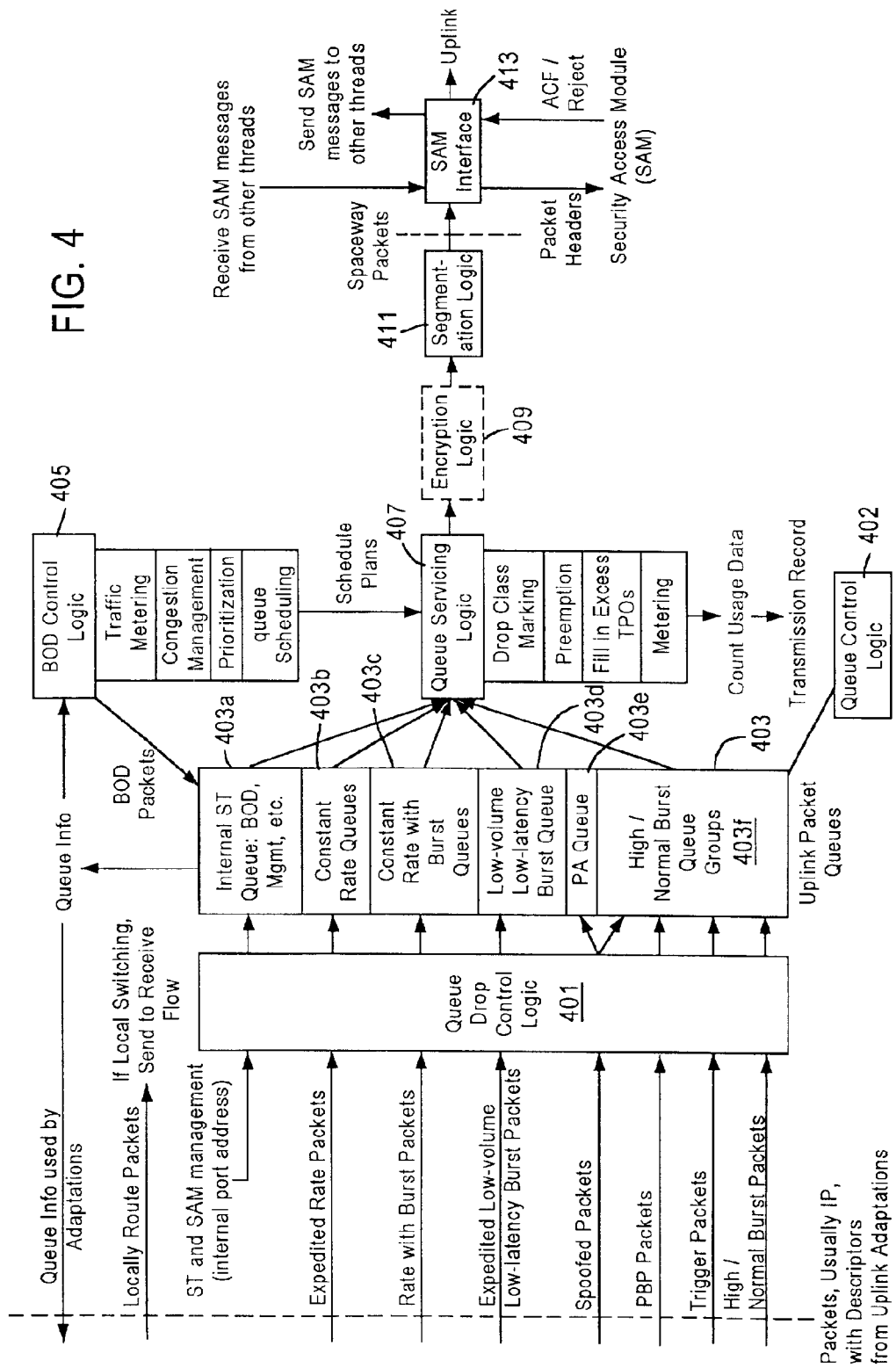
FIG. 4 is a diagram of the transport platform of the ST of FIG. 3, associated with the uplink packet thread.

FIG. 4 shows a diagram of the transport platform of the ST of FIG. 3, associated with the uplink packet thread. TP 307 of ST 300 forwards packets to satellite 101 using an uplink packet thread. This thread is performed by a queue drop control logic 401, which filters out packets based on various policies and transmits other packets to a set of uplink packet queues 403. The management of these queues 403 is controlled by queue control logic 402 and more fully described with respect to FIG. 5.

A Bandwidth-on-Demand (BoD) control logic 405 performs traffic metering, congestion management, prioritization, and queue scheduling to send BoD packets to the queues 403. The BoD control logic 405 also outputs schedule plans to a queue servicing logic 407. The scheduling operation is further described below in FIG. 6. Queue servicing logic 407 executes the following functions: drop class marking, preemption, fill-in, and metering. The output of the servicing logic 407 may be encrypted via an encryption logic 409, which in turn, provides encrypted packets to a segmentation logic 411. The segmentation logic 411 may segment the encrypted packets into packets of a prescribed format. These formatted packets are then supplied to a SAM interface 413.

In providing user data transport services, ST 300 manages the set of queues 403 such that at any point in time, each service is mapped to a single queue or a group of queues 403; these queues 403 may be logical in form of a linked-list structure. According to one embodiment of the present invention, the queues 403 include the following queues: an Internal ST queue 403a for storing BoD packets, control packets, and management packets; a Constant Rate (CR) queue 403b; a Constant Rate with Burst (CRWB) queue 403c; a Low-volume Low-latency Burst queue 403d; Persistent Aloha (PA) queue 403e, and a Normal Burst queue 403f. For High Priority/Normal Priority Burst (HP/NPB) services and Low-volume Low-latency Burst (LVLLB) service, the mapping is based upon configuration by the NOCC 111. For Constant Rate and Constant Rate with Burst services, the mapping is based upon the Connection Management requesting instances of these services for each connection.

For the volume-based User Data Transport Services, the system design requires the ST to give separate treatment to packets destined to each downlink region (containing one or more destination downlink microcells), primarily to support the congestion control mechanisms and to control traffic to premium, highly utilized destinations. Whenever a volume-based service sends packets to multiple downlink regions, the service is mapped to a group of queues. Each queue holds packets destined to a set of one or more downlink microcells in the downlink region.

The set of one or more queues used to support a User Data Transport Service is termed a "Service Queue Group." All of the queues in a queue group use the same configuration and control parameters of the service, differing only by destination.

The Address Resolution and Classification functions map packets to a user service instance (identifying the Service Queue Group), destination downlink region, and connection number, which are used to select a specific queue. For the CR and CRWB services, the connection number is used to map to a specific queue 403 within the service instance. For the Normal/High Priority Burst (N/HPB) services, the downlink region is used to map to a specific queue 403 within the service instance.

To meet the system requirements, ST 300 maintains separate queues 403 for each service instance. Thus, the total number of queues 403 is the quantity of separate queues 403 multiplied by the number of downlink regions that the ST 300 makes BoD requests to or has connections to. The best QOS is achieved if each connection and service instance has its own queue, providing no interference, in-order delivery, and individual traffic shaping. In view of the above considerations, according to one embodiment of the present invention, ST 300 uses a separate queue for each connection for Constant Rate service. Likewise, for the Constant Rate with Burst services, ST 300 utilizes a separate queue for each connection. Each of the 4 instances of Normal/High Priority Burst service uses a group of queues; one for each destination downlink region. The Low-volume Low-latency Burst service uses a single queue. The number of downlink regions supported by ST 300 is a sizing parameter based on ST type.

ST 300 also supports burst services for carrying internally sourced messages. These messages include bandwidth requests, address resolution requests, and all management messages to the NOCC 111. According to one embodiment of the present invention, ST supports the following internal queues: a BOD/HVUL (Bandwidth-on-demand/High Volume) request queue; a power control message queue; a calibration message queue; a signaling message queue; and a normal management message queue. It is recognized that other internal queues may be added, depending on the particular implementation of system 100.

Figure 5:
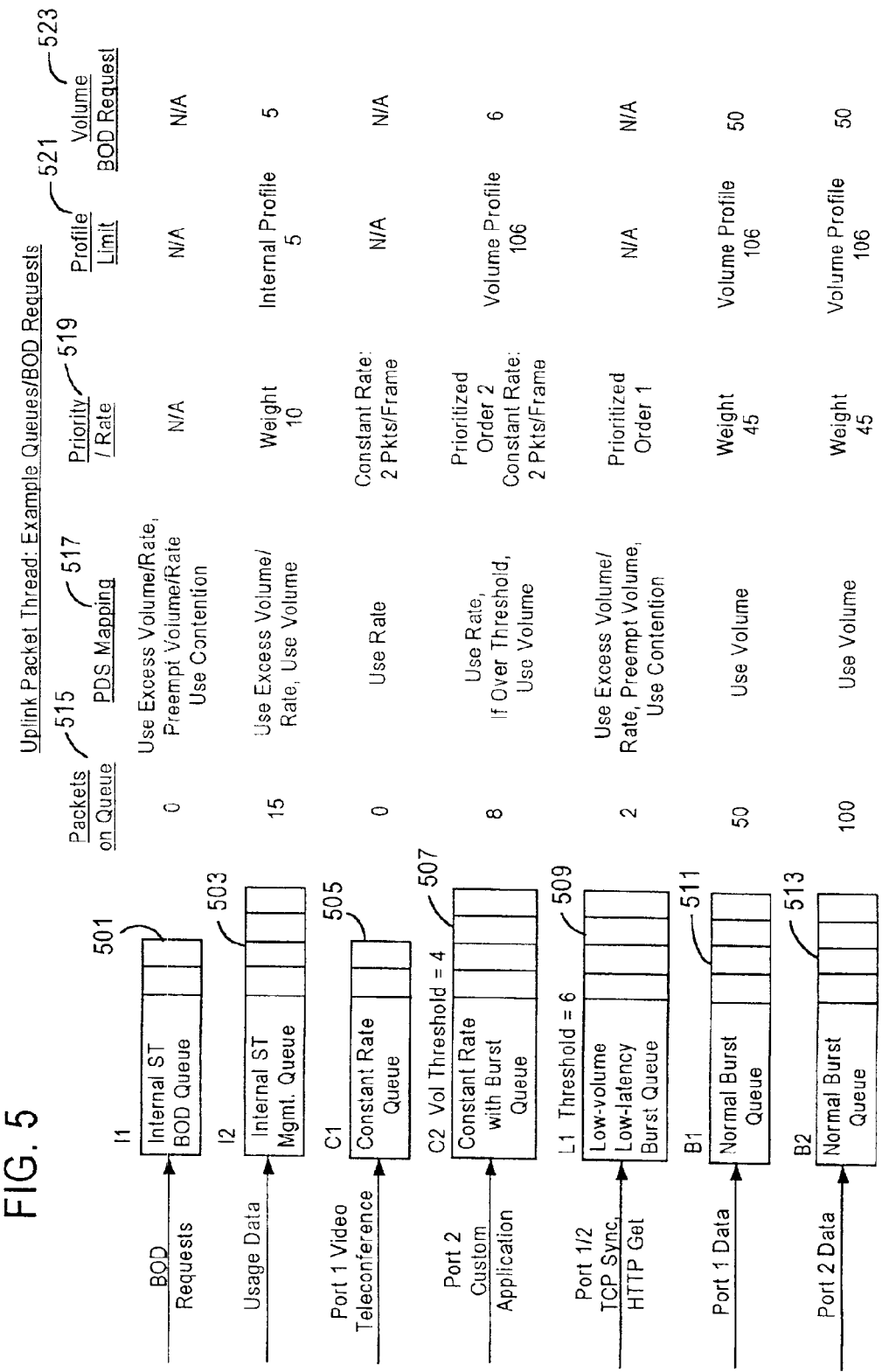
FIG. 5 is a diagram of exemplary queues whose depths are dynamically altered, according to an embodiment of the present invention.

FIG. 5 shows a diagram of exemplary queues whose depths are dynamically altered, according to an embodiment of the present invention. In this example, ST 300 utilizes an Internal ST BoD queue 501 for storing BoD request packets. An Internal Management queue 503 stores usage data, for example. A CR queue 505 supports a video teleconference from Port 1 of ST 300. A CRWB queue 507 stores packets carrying data related to a custom application (e.g., voice-over-IP). A LVLLB queue 509 is used to store, for example, TCP Sync packets and HTTP (Hypertext Transport Protocol) GET messages. ST 300 provides two Normal Burst queues 511 and 513 for user data. The depths of queues 507, 511, and 513 can be dynamically changed to enhance the efficient utilization of such queues.

In the example of FIG. 5, each of the queues 501–513, depending on the user service that it corresponds to, has a mapping to the PDS (i.e., rate and/or volume) and a service weight (i.e., priority). The PDS mapping is relevant to scheduling, which is detailed in FIG. 6. Column 515 in the diagram shows the number of packets in the queue; for instance, queue 501 is empty. Further, as indicated by the PDS Mapping column 517, Internal ST BoD queue 501 may employ excess slots of both volume and rate allocations, may pre-empt a volume/rate slot, and use a contention slot. The Internal ST Management queue 503 is shown to have 15 packets and a service weight of 10 (which is a unitless number), with a profile limit of 5. By way of example, queue 503 provides a BoD request for 5 packets. As for the Constant Rate queue 505, the PDS mapping is to a rate service; because rate services are given high priority by definition a rate is specified (e.g., 2 packets/frame). A Constant Rate with Burst queue 507 may use the rate service, as well as the volume service for any packets in excess of the rate. Queue 507 has a priority order of 2 and an associated rate of 2 packets/frame. The priority order specifies the relative prioritization among other high priority traffic. For instance, the LVLLB queue 509 has a priority order of 1; as a consequence, packets in this queue 509 are given preferential treatment over the packets in queue 507 during queue servicing. The Normal Burst queues 511 and 513 both use volume service and have equal service weights (e.g., 45). Queues 511 and 513 have profile limits of 106.

It should be noted that ST 300 use only a subset of the queues discussed above. Use of specific queues depends on the profiles of the particular ST 300. For example, a residential ST that is configured for Internet access service may only use Normal Burst queues 511 and 513 for transmitting data. It should further be noted that other queues can be defined as new user services are created.

For N/HPB and CRWB queues, ST 300 supports a dynamic buffer management scheme. Queue control logic 402 (FIG. 4) examines the queue traffic statistics that was collected during some configurable period in the past; in an exemplary embodiment, this pre-determined period is about 3 seconds. This queue management scheme allows any single burst queue to grow to the total size of all memory buffers (e.g., up to 3 seconds at the ST's full channel rate), assuming that that queue was using the entire channel rate. When many queues are sharing the channel rate, each queue is sized according to how much data it is successfully transferring. To prevent starving the more active queues, slow queues are not allowed to accumulate a large number of buffers.

Each queue has a minimum size so that it may ramp-up to a faster transfer rate (as in TCP slow-start). These minimum reserved buffers also reduce the total buffer space that can be assigned dynamically. The ST 300 sets the maximum queue depth equivalent to the number of internal system packets that were allocated to that queue during the previous pre-determined period. The queue depth is set according to the following equation:

New Queue Depth=$F^*$(sum of allocations for last $A$ frames)+$B$ (units in packets), where A is Allocations To Consider (Number of Uplink Transmission Frames: 10–50, default=30); B is the Minimum Queue Depth (for Packets: 10–100, default=32); and F is the Queue Depth Factor, which is a configurable parameter to adjust the impact of the past allocations.

Packets already on the queue beyond the new depth are not dropped. However, no additional packets can be added until the queue drops below this threshold. After processing the BoD allocations for the upcoming frame, the ST re-evaluates the sizes of all of the burst queues.

For CRWB queues, ST 300 supports fixed, configurable maximum buffer sizes that limit the maximum burst size. Within this maximum queue depth, the ST 300 applies the dynamic buffer management scheme, as described above.

For optimal TCP throughput (without spoofing), the ST needs to buffer enough data to allow for the maximum growth of the TCP windows given the round-trip time and channel rate. For these requirements, the transport platform buffer memory needs have been rounded up to 3 seconds at the ST's full channel rate.

For Constant Rate queues, the ST supports a fixed, configurable buffer size that can accommodate and limit input jitter. The LVLL queue also has fixed, configurable buffer size corresponding to the maximum queue depth.

Turning back to the discussion of FIG. 4. When an ST queue supporting a user service reaches its maximum depth, the queue drop control logic 401 drops any additional packets (referred to as the tail-drop mechanism). This tail-drop mechanism is employed by ST 300 to respond to congestion or a user service that is exceeding its profile—causing buffer space to become exhausted. Queue drop control logic 401 continues to drop packets until some have been drawn off the front of the queue, making room for new packets. This is an effective congestion control mechanism in that dropping of an IP datagram causes TCP to slow down the data transmission rate.

User Port Adaptations may need to use other methods of determining which packets should be dropped before sending them to the Transport Platform queues 403. The ST Transport Platform 301 provides information on the current depth of all of its queues for use by the adaptations in support of additional queue control mechanisms. Also, an indication is provided when a queue is full, so that the User Port Adaptation can avoid packet dropping.

ST 300 drops the entire user data packet if accepting that packet would exceed the buffer space currently allocated for that queue. Individual system packets are not dropped, as dropping causes partial drop of a user packet.

ST 300 maps traffic from each User Data Transport Service instance to one or more Packet Delivery Services (PDS). The rate and volume Packet Delivery Services are implemented using a Bandwidth Control Protocol or a High Volume Uplink. These and the data contention and persistent Aloha PDS, are discussed in greater detail later.

The Low-Volume Low-Latency (LVLL) service is primarily served using data contention. Whenever possible, the LVLL queue will pre-empt volume PTOs from any other user service or use excess rate, volume, or Persistent Aloha PTOs from any user service. When a User Port Adaptation sends a packet to the LVLL service, if the packet is larger than one codeblock or the LVLL queue is full, the transport platform must re-map the packet to a different configured service queue group. Within that group, the transport platform uses the destination downlink to map to a specific queue.

A variety of mechanisms are used to perform traffic metering in the ST 300, depending upon the type of Packet Delivery Service. Many of the mechanisms use the basic construct of the token bucket to implement a traffic profile. Each traffic profile is characterized by a Packet Refill Rate (PRR in units of system packets), a Refill Time Period (RTP in units of system transmission frames), and a Maximum Burst Size (MBS in units of system packets). The traffic profile token bucket starts full at the level specified by the Maximum Burst Size. The ST 300 subtracts one from the token bucket for each system packet that the ST forwards under the profile. The ST 300 replenishes the token bucket at the Packet Refill Rate on the Refill Time Period boundaries up to the limit of the Maximum Burst Size. At any given time, if the token bucket has been decremented to zero, any additional system packets are not forwarded on the path protected by that profile. Such packets are "blocked" and continue to wait on queue.

No usage (no profile) can be configured by setting the Maximum Burst Size parameter to zero. Unlimited usage can be configured by setting the profile parameters to values permitting traffic greater than the channel rate.

Volume services (Normal/High-priority Burst and the volume portion of Constant Rate with Burst) are metered differently in HVUL and non-HVUL modes. In the normal volume (non-HVUL) mode, volume services are metered at the BOD Request step using one token bucket for the HPV traffic profile and another token bucket for the total HPV+LPV traffic profile. Each profile controls all traffic for the PDS or combination of PDSs independent of the destination. A packet must pass both profile tests before the ST will include it in a high-priority volume BOD request. The two profiles provide a flexible mechanism that can be used to control the amount of traffic allowed for burst-based User Data Transport Services. It can be used to limit the uplink data rate of a terminal to less than the full channel rate, thereby supporting different grades of service for the same ST type.

In High Volume Uplink mode, volume services are metered separately for each HVUL destination downlink region during Queue Scheduling by scheduling no more packets for each transmission frame than the maximum set by the destination downlink algorithm. The limits are set per region by the HVUL congestion management mechanism described below.

Rate services (Constant Rate and the rate portion of Constant Rate with Burst) are handled differently by the ST than volume services; they are metered by shaping during Queue Scheduling. Token buckets are not used. At the time of connection setup (or equivalent), each rate-based service is assigned a Constant Packet Rate per uplink transmission frame, which has been approved for usage through the NOCC 111. Each rate queue is shaped to the CPR by drawing that number of packets (if present) off the queue for each transmission frame. These packets are not counted against the volume traffic profiles since they are a constant. So, for the Constant Rate with Burst Service, the constant rate portion is not counted against the volume traffic profiles, but any packets in the queue due to bursts above the constant rate are limited by the volume traffic profiles.

Data contention, preemption, and excess slot usage are metered using individual token buckets during Queue Servicing.

The ST 300 supports a number of queues for carrying internally sourced messages. These messages include bandwidth requests, address resolution requests, and all management messages to the NOCC 111. In order to support NOCC 111 server congestion management, each internal traffic queue that uses a volume PDS is metered by the ST application that sources the messages.

Use of Persistent Aloha (PA) is limited directly by the basic PA mechanism. If more than a small number of packets accumulate on the PA queue, then the queue is serviced using volume requests, which are metered as described above.

The ST 300 implements a prioritization mechanism which controls how different volume services (Normal/High-priority Burst and the volume portion of Constant Rate with Burst) are drawn against the traffic profiles for bandwidth requests and allocation sharing. This mechanism can be used to favor one volume service over another, or to ensure fair treatment between multiple instances of the same service. Also, certain internally sourced messages need to be given priority treatment. Each instance of Normal/High-priority Burst and Constant Rate with Burst service is configured with a Service Weight. The ST 300 determines how it apportions packets for each volume traffic profile using the Service Weight of all of the queues drawing on that traffic profile. The ST first serves the internal queues in a fixed priority order. Next the ST 300 serves all of the N/HPB and CRWB queues in a ratio determined by their relative Service Weights until the profile is exhausted. The service order is as follows: (1) serve the internal queues in this order until their individual traffic profiles are exhausted: a) signaling message queue, and b) normal management message queue; (2) serve these user service queues by their relative Service Weights until the HPV profile or the HPV+LPV profile is exhausted: a) CRWB queues configured to use high-priority volume, and b) High Priority Burst queues; and (3) serve these user service queues by their relative Service Weights until the HPV+LPV profile is exhausted: a) Constant Rate with Burst queues configured to use low-priority volume, and b) Normal Priority Burst queues.

Figure 6:
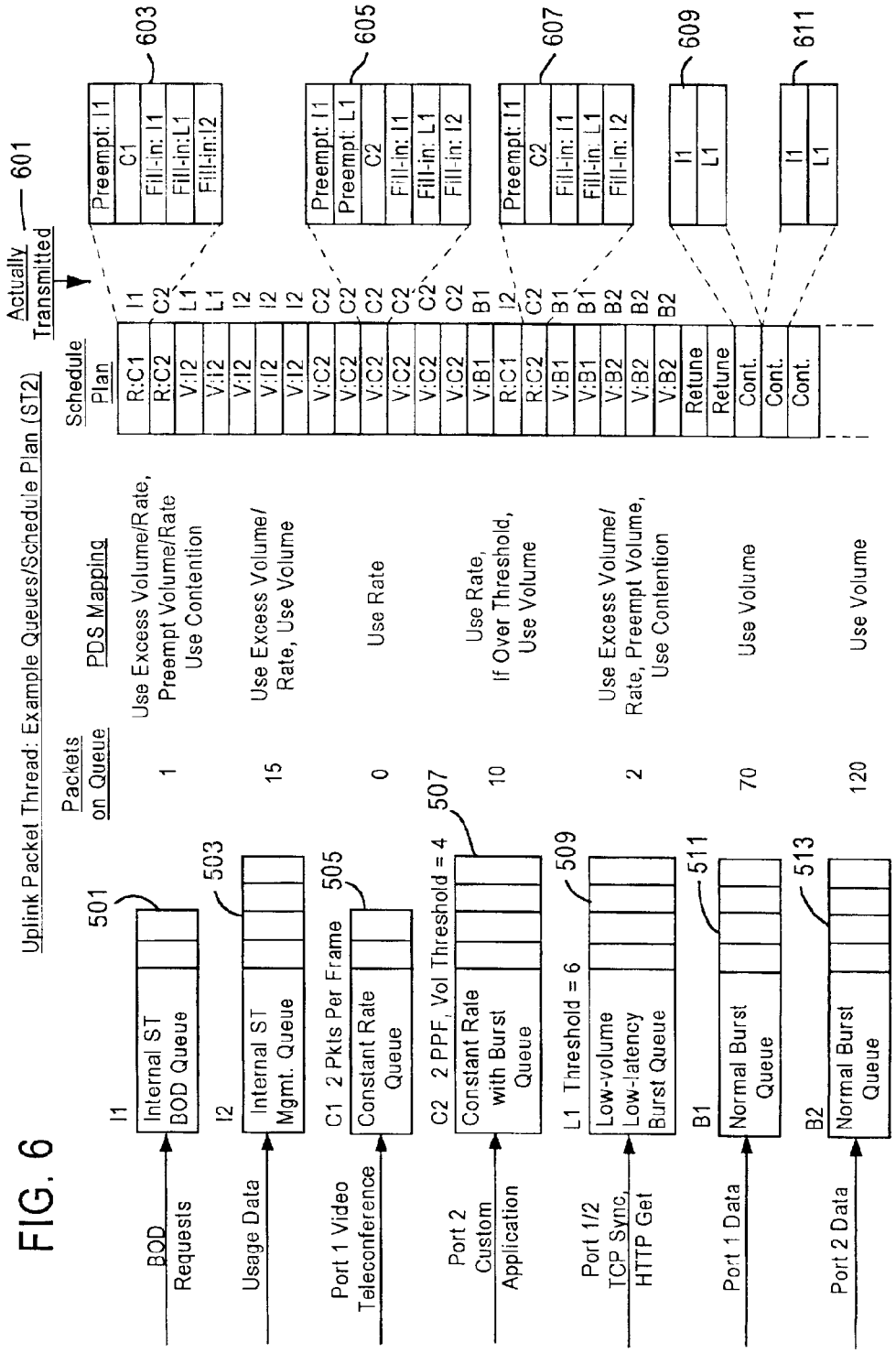
FIG. 6 is a diagram of a schedule plan for transmission of packets from the ST, according to an embodiment of the present invention.

FIG. 6 shows a diagram of a schedule plan for transmission of packets from the ST, according to an embodiment of the present invention. ST 300 performs uplink service scheduling at the time that it processes the received bandwidth allocation messages (or the equivalent for a High Volume Uplink channel) for an upcoming transmission frame. The allocation messages are all received a short time before the transmission frame time to which they apply. Beginning, for example, 23 milliseconds before the next frame starts, the ST 300 examines all of its allocations and produces an optimal schedule plan for mapping service packets to the available transmission slots. The schedule plan also determines if any slots are available for contention transmissions. The ST 300 cannot use allocation messages that are received too late. If this occurs, the ST 300 sends an alarm since system bandwidth is being wasted. If the ST receives no allocation messages, then it can still plan for contention transmissions.

The ST 300 prepares the schedule plan for rate-based services with the goal of minimizing the jitter experienced by each of the traffic flows. The ST 300 loops through all of the slots that are allocated for rate packet delivery in the upcoming frame. Since the rate connections are admitted by the NOCC 111, the proper number of rate allocations should be available unless there is a fallback mode transition occurring.

The allocated rate slots are already distributed throughout the frame to minimize jitter. As the ST 300 examines each packet transmission opportunity allocated in the frame, the ST 300 selects one of the queues serving Constant Rate or Constant Rate with Burst Service. The ST 300 assigns one packet transmission opportunity to a queue, then moves on to another queue. For each queue, the ST assigns a maximum of 2 to 2048 packets per frame, in increments of 2 packets, which corresponds to the Constant System Packet Rate for a Constant Rate Service or the rate portion of a Constant Rate with Burst Service. By scheduling the packet transmission opportunities algorithmically, the ST 300 ensures that packets from each queue appear in a repeating pattern from frame to frame with minimal jitter. This shapes the user traffic to the Constant System Packet Rate. The ST 300 schedules rate traffic this way for both HVUL and normal volume (non-HVUL) modes.

It should be noted that for a High Volume Uplink channel, the ST 300 may spread both the rate and volume opportunities more evenly than the current Bandwidth Request algorithm, since the ST 300 does not have to be limited by slot allocations. This would improve the jitter and the impact of HVUL bursts on the system. This can be accomplished by first scheduling the packet transmission opportunities in numerical order and then applying a random mapping to re-sort all the PTOs. The same mapping may be used for each frame.

In the normal volume (non-HVUL) mode, the ST prepares the schedule plan for volume-based services with the goal of weighting the volume bandwidth allocations among the queues that have outstanding volume requests. For each queue, the ST 300 keeps track of the number of packets that were used to make High Priority or Low Priority Volume bandwidth requests. The ST 300 loops through all of the slots allocated for volume packet delivery in the upcoming frame. Each volume allocation is made for a specific set of destinations. The ST 300 shares that allocation among the queues that made requests to those destinations. The allocation is shared among the queues using the service order and weighting mechanism described above.

For slots allocated for High Priority Volume, the ST 300 serves the internal queues in order (up to the amount requested) until the allocation is exhausted. Next, the ST 300 serves these user service queues by their relative Service Weights (up to the amount requested) until the allocation is exhausted: (1) Constant Rate with Burst queues configured to use high-priority volume, and (2) High Priority Burst queues.

For slots allocated for Low Priority Volume, the ST 300 serves these user service queues by their relative Service Weights (up to the amount requested) until the allocation is exhausted: (1) Constant Rate with Burst queues configured to use low-priority volume, and (2) Normal Priority Burst queues.

In High Volume Uplink mode, the ST 300 prepares the schedule plan for volume-based services with the goal of weighting the volume bandwidth allocations among the volume services while metering separately for each HVUL destination downlink region. The ST 300 schedules no more packets for each transmission frame than the maximum set by the destination downlink algorithm. The HVUL ST is allocated a specified number of slots in every uplink frame. The allocation is shared among the queues using the service order and weighting mechanism. The queues are served in this order: (1) the internal queues in order (up to the downlink limits) until the allocation is exhausted; and (2) user service queues by their relative Service Weights (up to the downlink limits) until the allocation is exhausted: a) Constant Rate with Burst queues configured to use high-priority volume, and b) High Priority Burst queues.

For slots allocated for Low Priority Volume, ST 300 serve these user service queues by their relative Service Weights (up to the downlink limits) until the allocation is exhausted: (1) Constant Rate with Burst queues configured to use low-priority volume, and (2) Normal Priority Burst queues.

In the normal volume (non-HVUL) mode, the ST 300 plans for contention transmission whenever possible. Contention is not used in the High Volume Uplink mode. There must be at least three unused contiguous slots available to schedule contention. This allows for tuning to and from the contention channel, since each re-tuning requires one slot time. After scheduling for rate and volume, the ST 300 scans the schedule plan for open areas of at least three slots. In each of these, it schedules for possible contention transmission. Each frame, the ST 300 picks a contention channel to use and will "park" on that channel just in case a packet allowed to use contention comes along.

The ST 300 also schedules the usage of preemption and excess slots for the services allowed to use these features. Preemption and excess slots can be used for any types of rate, volume, or contention packet transmission opportunities. For each packet transmission opportunity (PTO) in the schedule plan, the ST 300 specifies a list of queues: (1) queues that can pre-empt this allocation (primarily BOD and Low-volume-Low Latency packets); (2) the main queue for this allocation; and (3) queues that use excess slots (primarily ST management and Low-volume-Low Latency packets). It should be noted that the relationships of which queues are allowed to pre-empt others and which queues are allowed to use the excess slots are known when the user services are configured. Thus, for each PTO, the schedule plan can point to a list of queues that define the relationships for that main queue.

When building the schedule plan, the ST 300 consults the Uplink Power Control thread (ULPC) for the proper power settings. The ULPC thread uses the frame number and channel number to look up and interpolate the correct power setting for each transmission. The packet thread will invoke this ULPC algorithm each time it schedules a different channel in the plan for the upcoming frame. There may be three different channels that are used in any one frame: the allocated rate/volume channel, the data contention channel and the persistent Aloha channel. The channel and power settings are added to the schedule plan for each slot; they are put into effect at the actual beginning of each slot time.

The ST 300 performs uplink packet servicing at a time as close as possible to each upcoming packet transmission opportunity. Using the schedule plan and the packet servicing behaviors, the ST 300 draws a packet from the appropriate queue and forwards the packet to the remaining uplink functions.

ST 300 performs the basic servicing of the Rate-based queues as follows. When the packet servicing function processes a Rate packet transmission opportunity in the schedule plan that is assigned to a specific queue, the ST 300 takes a system packet's worth of data off of the specified queue and forwards it to the next uplink function. A packet will be available on that queue unless the traffic has exceeded its expected jitter or the traffic flow is pausing or terminating. If no packet is available on the queue, this packet transmit opportunity may be used for other services as described below. It should be noted that traffic from other Constant Rate services will not use this opportunity, since the Rate traffic is strictly scheduled to support shaping and jitter reduction.

For the basic servicing of Volume-based queues, ST 300 follows a similar process. When the packet servicing function processes a Volume packet transmission opportunity in the schedule plan that is assigned to a specific queue, the ST takes a system packet's worth of data off of the specified queue and forwards it to the next uplink function. A packet will be available on that queue which corresponds to a Volume request unless one of the preemption mechanisms (such as internal traffic taking unused Rate packet transmission opportunities) has removed it early.

ST 300 serves an internally sourced packet (if any are ready) for each unused Rate packet transmission opportunity. Internally sourced messages include bandwidth requests, address resolution requests, and all management messages to the NOCC 111.

As shown, at time of servicing, Internal ST BoD queue 501 has one packet to transmit. The Internal ST Management queue 503 has 15 packets. The Constant Rate queue 505 has no packets, while the CRWB queue 507 has 10 packets stored. The LVLLB queue 509 stores 2 packets. Normal Burst queues 511 and 513 stores 60 and 120 packets, respectively. Based in part on the previous allocations to these queues 501–513, the BoD control logic 405 generates a schedule plan 601 that assigns packet transmission opportunities (PTOs), or slots, to the queues 501–513.

In the first PTO, the schedule plan 601 specifies that the packets of Constant Rate queue 505 may transmit if the queue 505 has packets to send. However, the schedule plan 601 may be pre-empted according to a hierarchical list 603 of queues. This list 603 is created by the queue servicing logic 407 and prioritizes the queues. List 603 indicates that if queue 501 has packets to send it may do so, otherwise the PTO is given to the intended queue 505. In this case, because Internal ST BoD queue 501 has packet I1, packet I1 will occupy the slot during actual transmission. However, in the event that queue 505 does not have packets, list 603 specifies the queues that may fill-in the slot. For example, the fill-in queues may be queues 501 (again if a packet arrives), 509, and 503.

For the $10^{th}$ PTO, list 605 specifies that queues 501 and 509 may pre-empt queue 507. Queues 501, 509, and 503 (in this order) may fill-in. In PTO 16, list 607 permits queue 501 to pre-empt, while queues 501, 509, and 503 may fill-in. PTOs 24 and 25 have corresponding lists 609 and 611 that permit queues 501 and 509 to transmit, whereby queue 501 is given the higher priority.

The above approach ensures that the prioritization of user services as well as internal control messaging is effectively processed.

To produce the schedule plan (like that shown in FIG. 6), ST 300 evaluates the amount of traffic in each queue 403. Next, the ST 300 examines the weighting of the queues 403, thereby determining priority. Based upon the queue weighting and stored traffic, ST 300 transmits a BoD request to the satellite 101. Thereafter, ST 300 receives the allocations—i.e., packet transmission opportunities (PTOs). These PTOs are matched up with the appropriate queues according to the service weights. A schedule plan is prepared by the ST 300 for the upcoming frame. The capability to produce the schedule plan advantageously provides a mechanism to guarantee quality of service levels. By contrast, conventional switching and/or routing systems cannot predetermine a transmission plan, as the packets are treated largely on a individual basis. Next, the ST 300 performs queue servicing according to the prepared schedule plan.

Queue servicing is executed as close as possible to each PTO, cycling down the list of queues in the schedule plan. ST 300 first takes packets from the queue(s) that is designated as having preemption rights (i.e., "preemption queue"), and then packets from the primary queue, which is the queue that the schedule plan specifies. If the main queue does not have packets, then the designated fill-in queues are serviced. First, the ST 300 examines the list for the particular PTO, checking whether the preemption queue(s) has data to be transmitted. The Internal ST BoD queue 501 is designated as the preemption queue. That is, BoD request packets I1 is allowed to occupy the slot assigned to the constant rate data, C2, from queue 507. In this instance, because the preemption queue contains I1, the ST 300 transmits the packet in this PTO (or slot). However, if the preemption queue (e.g., queue 501) were empty, the primary queue (e.g., queue 507) is checked to determine whether a packet is stored therein. Assuming the primary queue is empty, the designated fill-in queues are checked, in the order enumerated in the list. In this example, the fill-in queue is reserved for high priority services, such as the LVLLB services; i.e., queue 509. Next, the ST 300 examines the next available PTO, repeating the previous steps until all the PTOs are satisfied. According to an embodiment of the present invention, the PTOs correspond to the available time slots of the TDM frame.

Figure 7:
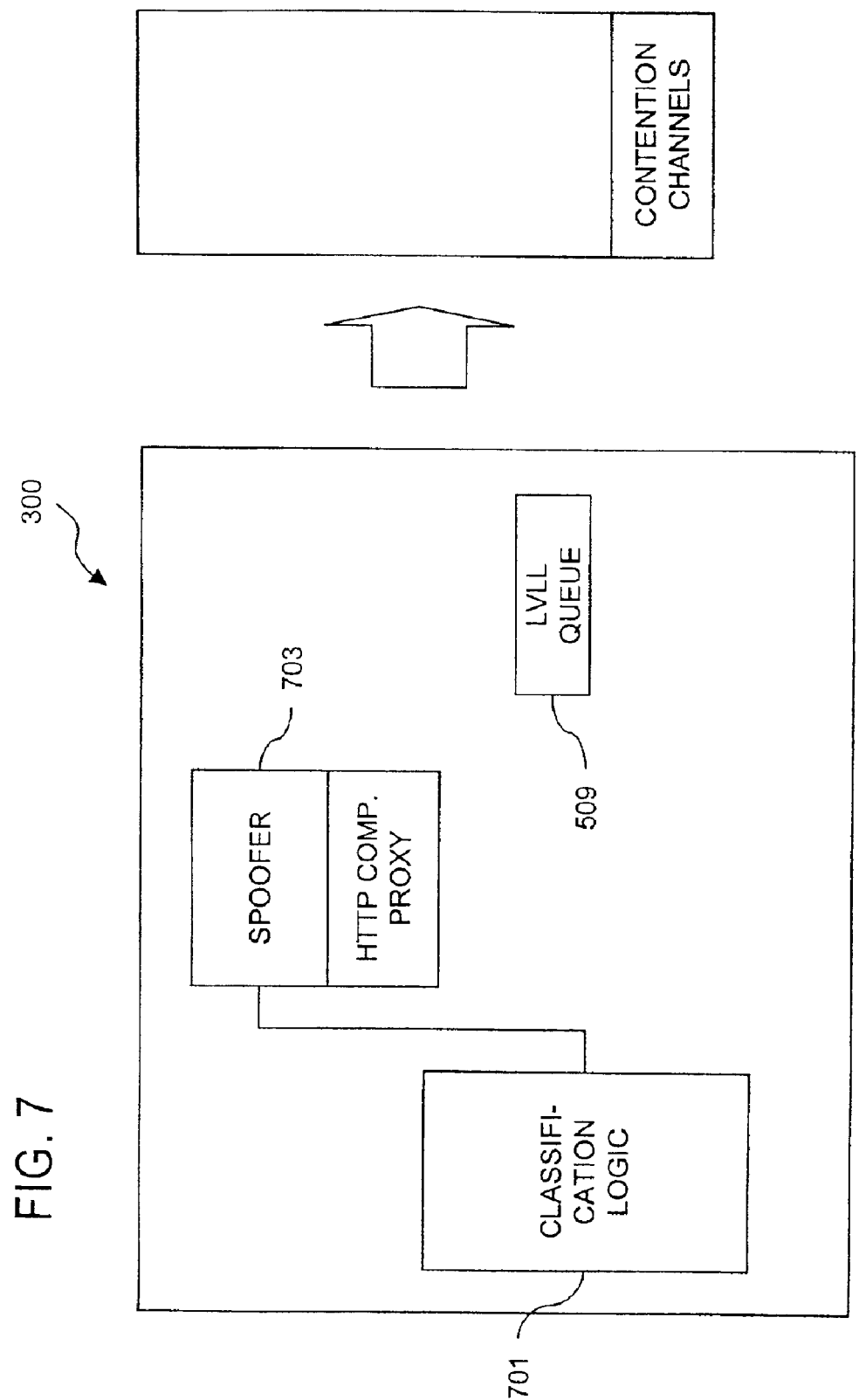
FIG. 7 is a functional diagram of an ST that is capable of classifying and queueing incoming data traffic, according to an embodiment of the present invention.

FIG. 7 shows a functional diagram of a ST that is capable of classifying and queueing incoming data traffic, according to an embodiment of the present invention. The large propagation delay of a geostationary satellite link, as in system 100, can limit application performance. Thus, the satellite system 100 needs to be optimized to process TCP/IP traffic, thereby enhancing Internet applications, such as web browsing. Because STs are access points into the satellite system 100, STs are provided with the capability to segregate TCP traffic for special or expedited treatment. According to one embodiment of the present invention, ST 300 includes a classification logic 701 that maps the received data traffic into various transport services that are offered by the system 100. The classification logic 701 operates in conjunction with a spoofer 703 to place TCP traffic onto the LVLLB queue 509. As discussed previously, packets that are stored within the LVLLB queue 509 can pre-empt volume allocations. Furthermore, these TCP packets can be scheduled for transmission over the contention channels (e.g., lists 609 and 611 of FIG. 6).

Typically, latency as measured at the application is the crucial metric. ISPs (Internet Service Providers) specifically require the lowest possible latency when performing short web transactions. Satellite system 100, according to an embodiment of the present invention, predominantly uses TCP for traffic transport. The metrics for evaluating TCP performance are data rates achieved in long transfers and latencies associated with short transfers. TCP acknowledgement spoofing is provided system 100 to improve these metrics by evading performance-limiting TCP congestion control and connection setup behaviors. Spoofer 703, which performs such spoofing and assumes duty for reliable data transport, resides at the ST 300. Spoofer 703 complies with the TCP protocol; in particular, IETF (Internet Engineering Task Force) RFCs (Request for Comments) 793, 1122, 1323, 2018, and 2581, which are incorporated herein by reference in their entireties. It should be noted that TCP is operable over system 100 without spoofing.

TCP spoofing splits the end-to-end TCP connection, resulting in three tandem connections between the end hosts. In this "split TCP" scheme, each host uses whatever version of TCP it has. The TCP connection from a source host extends to an associated source ST and is terminated at that ST. The TCP data from that flow is sent by the source ST to a destination ST using a reliable protocol. Appropriate information describing the TCP connection is also sent so that the destination ST can use TCP to transport the data to the ultimate destination host as intended by the source. Thus, a TCP connection is split into two terrestrial TCP connections joined by a third connection over the satellite link. An additional benefit to this design is that the protocol operating over the space link does not operate outside the satellite system 100, and so may be tailored specifically for system 100. This allows both performance optimization and more efficient uplink capacity utilization.

When such a spoofing relationship exists, a backbone connection is established between the STs. Besides carrying all spoofer messages, all spoofed TCP connections between the respective ST ports are multiplexed over this common backbone connection. This allows spoofing TCP's 3-way handshake and greatly reduces the time to establish a TCP connection. This 3-way handshake is described in more detail in the discussion of FIG. 9. The protocol used to reliably communicate over the backbone connection is called the PEP (Performance Enhancing Protocol) Backbone Protocol (PBP).

Classification logic 701 rules are used to map IP flows to User Data Transport Services (or UDTS), which are services that are characterized by performance expectations, such as loss and latency levels. In an exemplary embodiment, three UDTSs are defined: bulk transport, messaging transport and real-time transport. Classification to one of these transport architectures can take place without the need of an IETF-defined QoS or customer-defined specifications. As mentioned previously, generally Constant Rate (CR) and Constant Rate with Burst (CRWB) UDTS are used for real-time traffic. High Priority Burst (HPB) and Normal Priority Burst (NPB) UDTS are used for bulk traffic (as is CRWB on occasions) and certain messaging. The Low Volume Low Latency (LVLL) service is used primarily for small messaging and very short bursts, such as web traffic, and point-of-sale (POS) transactions.

The ST 300 is capable of calling out special processing that is to be applied to a flow, such as spoofing via spoofer 703. Based on the destination address and the UDTS, the classification logic 701 routes a received flow a specific queue. In this example, identified TCP messages (e.g., TCP SYN, HTTP GET, etc.) are sent to the LVLLB queue 509.

The spoofer 703 acknowledges data received at ST 300 to reduce the round trip time (RTT) perceived by the sending and receiving hosts. This reduction of the perceived RTT is an important benefit for satellite communication, because TCP congestion control responds to measurements taken on an RTT basis. The spoofer 703 is compatible with the TCP protocol, and so the sender and receiver end hosts believe they are directly communicating with each other when instead they are communicating with local spoofers.

Specifically, the spoofer 703 accepts incoming TCP/IP datagrams, and "spoofs" the sending TCP by sending it TCP acknowledgements, even though the data thereby acknowledged has not yet actually been delivered to the ultimate destination. The spoofer 703 conceptually comprises a TCP implementation which communicates with a terrestrially-connected end host, and a TCP spoofing manager (TSM), which manages communication between that TCP implementation and the PBP. The spoofer 703, according to one embodiment of the present invention, resides at the ST port, and the backbone connections extend between ports of the originating ST and the destination ST.

First, the TCP of a source host attempts to open a connection with the TCP of a specified destination host. When the IP datagram bearing the source host's TCP SYN segment arrives at the host's associated ST port (hereafter called the "source ST port"), a decision is made to apply spoofing, or not, for that new flow. The minimum basis for this decision is the destination TCP port number. Assuming spoofing is to be applied, the IP datagram is directed to that port's spoofer. Next a decision is made whether to spoof the three-way handshake. The minimum basis for this decision is the destination TCP port number as well. If the spoofer 703 is to spoof the TCP three-way handshake, a TCP stack associated with that spoofer 703 responds to the SYN segment, and establishes a terrestrial TCP connection with the source host. If the three-way handshake is not to be spoofed, the original SYN segment is sent to the destination host. After appropriately handling the SYN segment, the spoofer 703 binds all data arriving with the same source/destination IP addresses and source/destination TCP port numbers to the spoofed TCP flow.

The data from a TCP/IP datagram sent by the source host on that TCP connection is sent via PBP to the peer spoofer associated with the destination ST port. The destination ST port's spoofer must then deliver the data to the destination host using TCP/IP. The information needed to synthesize an appropriate TCP/IP header for the ultimate delivery must, then, necessarily be communicated by the source spoofer.

When starting to carry a TCP flow, the source TSM sends to its peer TSM at the destination ST port the source and destination IP addresses and TCP port numbers from the source host-originated IP datagram bearing the SYN segment which initiated the terrestrial TCP connection just described. The source TSM also chooses a "TSM flow ID" to identify the spoofed TCP flow, and employs a supporting PBP backbone connection to deliver this information to the destination TSM. Once the association of the TSM flow ID to the IP addresses and TCP port numbers has been relayed, TSM can identify the flow exclusively by the flow ID. Thus TCP flows are converted to "TSM flows" on a one-to-one basis, and less overhead is sent with each segment relayed for spoofed TCP connections. TSM flow IDs are unique between ST port pairs.

Capacity efficiency is slightly improved by having the source TSM delay sending the TSM flow information to its peer until some data for that flow is available to send as well. This allows combining the flow configuration information with the first data packet into a single PBP packet, and also prevents configuring a TSM flow for a connection which closes before sending any data.

It should be noted that TCP/IP headers are not the only overhead which must be detected and contracted (i.e., compressed). Additional cases to be regarded are L2TP, and IP tunneling (including possibly more than one layer of IP encapsulation). Necessary information from such other headers must also be relayed to the destination PEP so that it can properly regenerate the headers for transport to the destination host.

Spoofer 703 includes an HTTP compression proxy functionality, which compresses HTTP GET messages. An objective of this compression functionality is to compress HTTP GETs into a single packet transmission slot, thereby enabling their transmission onto a contention channel. It has been observed that, on average, about 80% of HTTP GETs are less than 280 bytes long; however, most of those are more than 200 bytes long. Additionally, of that data, most of the information is repeated. By storing the repeated information at the destination ST, sufficient compression can be achieved.

The compressed GETs are forwarded by the HTTP proxy to the PBP to be sent over the LVLL service. It should be noted that certain GET messages may not be compressed; for example, the initial GET message needs to be transmitted to the destination ST in uncompressed form, as the destination ST does not have the repeated information as yet. GET messages, which could not be compressed, or other data that are sent over the TCP connection, employ a burst-based UDTS. The TCP spoofer 703 at the other end of the space link combines messages sent on both UDTSs onto a TCP connection to a web server.

Figure 8:
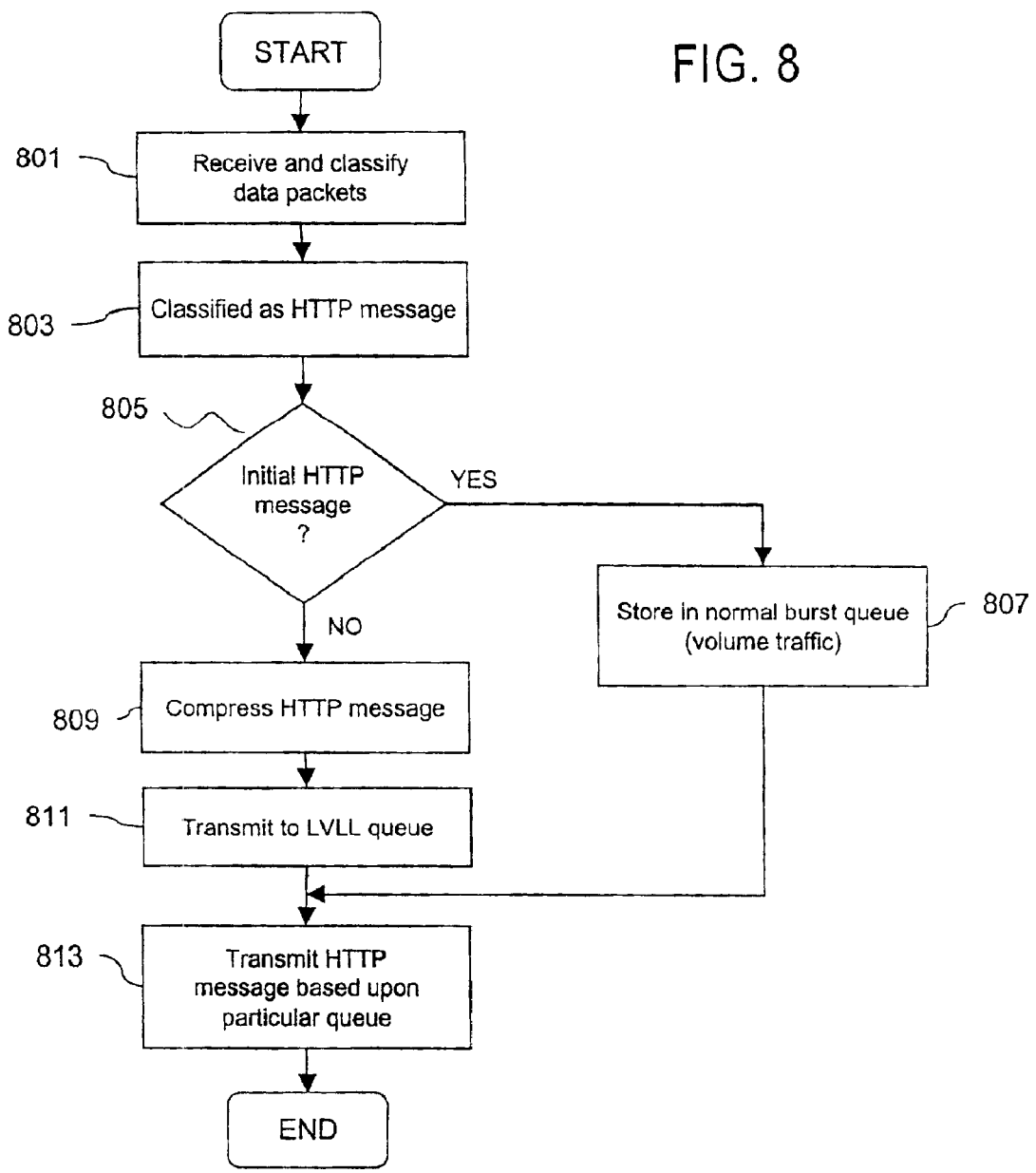
FIG. 8 is a flowchart of the classifying and queueing operation, according to an embodiment of the present invention.

FIG. 8 shows a flowchart of the classifying and queueing operation, according to an embodiment of the present invention. In step 801, ST 300 receives data packets from an end user host (not shown) and classifies the received traffic to the corresponding user data services. By examining the header of the packet, the classification logic 701, in this example, detects that the packet is a HTTP GET message (step 803). In a normal web transaction, multiple GET messages are issued by the end host; these GET messages are destined to a web server (not shown) that is connected to a destination ST (not shown).

If the received packet is an initial HTTP message (step 805), the message is directed to a normal burst queue 511 associated with volume traffic, per step 807. Otherwise, the HTTP message, as in step 809, is compressed by spoofer 703. Because certain header information in the initial HTTP message is stored in the destination ST, duplicate information can be eliminated in the subsequent HTTP messages, thereby resulting in a compressed message. This compressed message is forwarded to the LVLLB queue 509 for expedited treatment, per step 811. In step 813, the HTTP message is transmitted according to the particular queue where the message was stored. For example, the LVLLB queue 509 is a higher priority queue than the normal burst queue 511; accordingly, the packet that is stored within LVLLB queue 509 may pre-empt volume allocations or alternatively use a contention channel to send the HTTP message. In the later scenario, the HTTP message is compressed so that it may fit into a packet size that corresponds to the contention channel.

To better appreciate the present invention, it is instructive to examine the mechanics of a TCP data transfer, as described below in FIG. 9.

Figure 9:
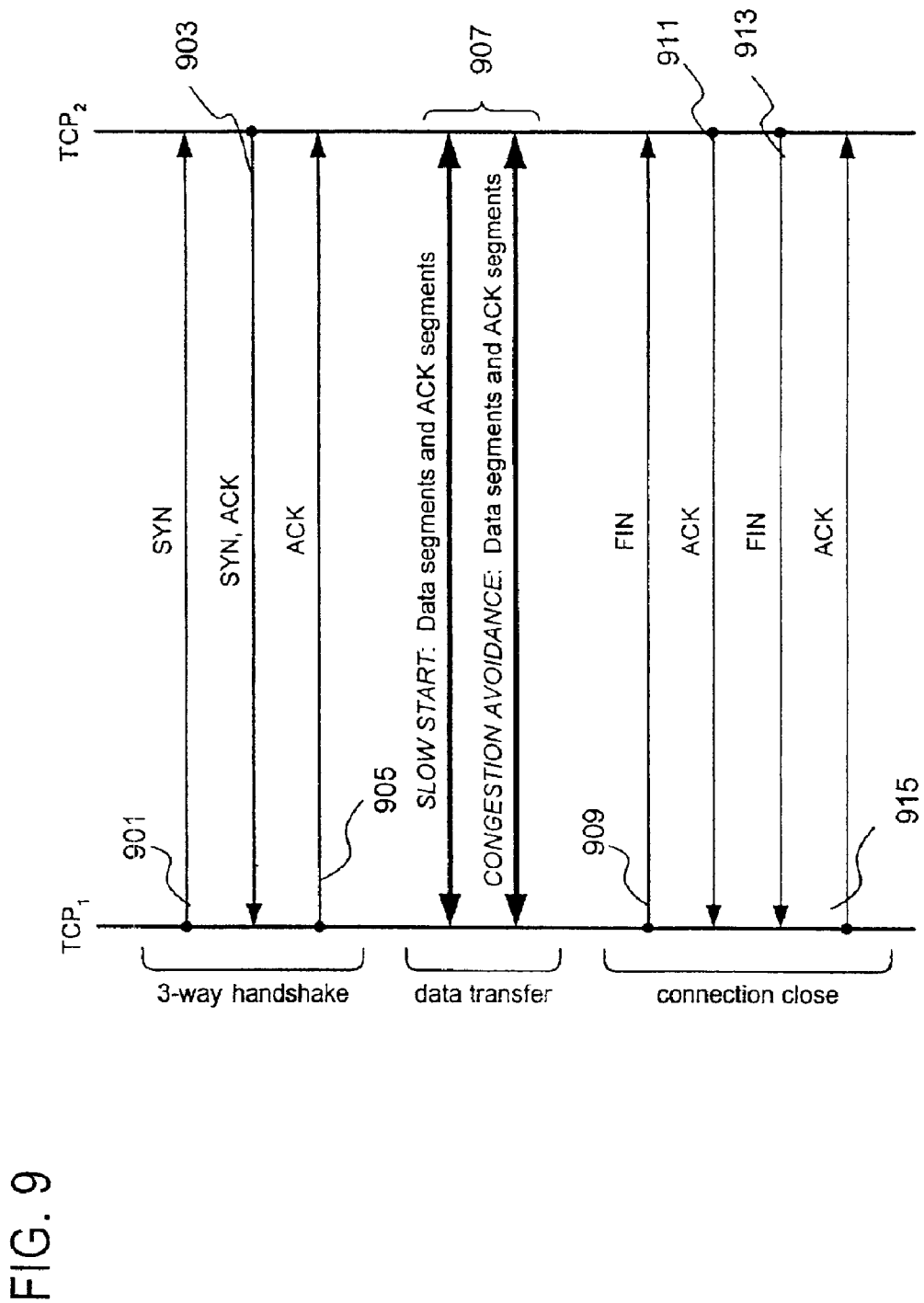
FIG. 9 is a flow diagram of the operation of a TCP (Transmission Control Protocol) session establishment and termination.

FIG. 9 shows a flow diagram of the operation of a TCP (Transmission Control Protocol) session establishment and termination. TCP is used to reliably transfer data between two hosts. The TCP functionality need reside only in the two hosts at each end of the transfer; TCP, according to one embodiment, uses IP to deliver data between hosts. Opening a TCP connection between two hosts traditionally requires a three-way handshake to coordinate the initial sender and initial receiver sequence numbers prior to sending data. The main reason to do this is a concern that old TCP segments can get delayed in the network and be delivered at a much later time. The exchange of these three messages costs one and a half round trip times, assuming no processing delays in the end-hosts. The TCP header bears "SYN", "FIN" and "RST" bits which are set to indicate a connection is being opened, closed, or aborted, respectively.

TCP divides the data to be transferred into packets called TCP segments. In step 901, a TCP SYN message is transmitted by a source end user host (i.e., source host) to a destination end user host (i.e., destination host) to initiate a TCP session. The destination host, in turn, transmits TCP segments with the SYN and ACK bits set to acknowledge the request, per step 903. Next, the source host acknowledges that the message from the destination host has been received (step 905). Thereafter, a TCP session is established, whereby data transfer between the source host and destination host can commence (as in step 907).

TCP supports a mechanism, known as "path MTU discovery", that is used to match this size to the maximum size the network can support without further fragmentation. A typical consequence is one TCP segment fits into one IP datagram which fits into one Ethernet frame (assuming Ethernet as the link layer). The IP packet bearing the TCP segment is then normally not longer than 1500 bytes, the maximum Ethernet frame size.

TCP indexes information it transports with sequence numbers which count bytes, not segments. Once a segment is received at the other end, a 40 byte (or 58 byte) acknowledgement TCP/IP message is sent back indicating the sequence number of the next byte that is expected to be received. The acknowledgement sequence number does not advance if out-of-sequence data arrives, although such data does elicit acknowledgement(s).

TCP conducts retransmissions of data detected to have been lost in transport. Originally, a loss would be detected by the expiration of a timer started when a segment was sent, and which would have been canceled by an acknowledgement indicating receipt of that data. A timer expiration indicates no acknowledgement was received for the data corresponding to that timer.

TCP may infer a loss if "duplicate" acknowledgements (DUP-ACKS) arrive indicating the same sequence number. Since acknowledgements are generated only when data is successfully received, such "duplicate" acknowledgements indicate segments subsequent to the lost one were received intact.

The timeout value (RTO) for the aforementioned timer may be estimated by smoothing values of the measured round-trip-time and its variance. The minimum value is often about 0.5 seconds. If RTT measurements are identical, the RTO value will converge to the RTT very fast (within 10 RTTs), but if there is even a small amount of measurement variance, the RTO value may easily inflate to several tens of seconds.

TCP controls the injection rate of data into the network by limiting the amount of data that is allowed to be "outstanding" (i.e., not yet acknowledged). This amount describes the size of a sliding "window" which is the minimum of the "congestion window size" (CWND) regulated by TCP congestion control at the sender and the window size advertised by the receiver. When the last byte within the window has been sent, transmission stops while an acknowledgement is awaited. An acknowledgement signals that data has been successfully received and allows the window to advance. In this fashion, acknowledgements control the window's advance and the rate of sending data. This mode is often referred to as "self-clocked" because the arrival of acknowledgements ("ACKs") clocks out data.

TCP assumes that the loss of a segment is a congestion signal. For all practical purposes, it is the only measure of congestion available. To avoid congestive losses, TCP incorporates congestion control techniques. One such technique is "slow start," which probes for capacity when the congestion status of the network is not known. TCP starts in slow start and will return to slow start after a retransmission timeout or after a prolonged idle period. Initially, CWND is set to 1 segment (although it is allowed to be set to 2 and, experimentally, it can be set to as much as 4). When each ACK is received, TCP adds one to the CWND value. Thus (ignoring delayed ACKs), one segment is sent in the first round-trip-time (RTT), two in the second, four in the third, and eight in the fourth. Because of delayed ACKs, the multiplicative increase factor is actually not 2 but 1.5 every RTT. This procedure is followed until a loss is encountered, or CWND attains a maximum value, referred to as the slow start threshold (SSTHRESH). At the start of the connection, the value is set to the maximum value, and it is reset to one-half the CWND value after loss is encountered.

As a result, the time it takes to complete slow start is:

$$RTT*\log_{1.5}(RTT*Bandwidth/SegmentSize)$$

Although slow start is normally escaped fairly quickly when operating over the terrestrial Internet, this expression indicates the large RTT experienced with a satellite link would impose almost 6 seconds for TCP to build up to a 500 kbps transfer rate (with RTT=0.7s). Small transfers over such a link might occur entirely in slow-start.

After CWND attains SSTHRESH, operation switches from slow-start to congestion avoidance. Congestion avoidance is an "additive increase, multiplicative decrease" (AIMD) algorithm which probes slowly for extra capacity and responds quickly to network congestion. Each time an acknowledgement is received the congestion window size is increased by one segment divided by the current congestion window size. This effectively adds one segment to the congestion window every RTT. If a loss is encountered, the currently recommended procedure is to enter fast retransmit/fast recovery. In this procedure, the congestion window is halved, SSTHRESH is reset to this new value, lost segments are retransmitted, and congestion avoidance operation is resumed. Some older versions wait for a timeout or go directly to slow start (TCP Tahoe), which all has the effect of slowing the recovery by the time it takes to timeout and perform the slow start to the SSTHRESH value.

If the selective acknowledgement (SACK) option is used, then the receiver can inform the sender which segments need to be retransmitted. This option not only allows for faster recovery from a loss, it reduces network congestion by retransmitting only the segments which were lost.

The last component of TCP congestion control is the Karn algorithm. During periods of serious congestion, TCP will exponentially back off the frequency at which it attempts to insert a starter segment into the network.

For periods that TCP spends in congestion avoidance, it can be shown that, as a result of the AIMD algorithm, a simple relationship holds between the average TCP injection data rate and the rate at which segments are lost. This equation is called the "TCP friendly" equation:

$$DataRate \leq C\frac{SegmentSize}{RTT\sqrt{p}}$$

The name comes from the fact that any protocol that obeys this relationship shares bandwidth fairly with TCP. In the above equation, C is a constant that depends on the circumstances; for randomly distributed loss C=0.93. P is the ratio of congestion signals to the number of segments sent. In the case of fast retransmit/fast recovery, a congestion signal is the arrival of three ACKS all acknowledging the same sequence number. Hence, a dropped segment will cause a congestion signal. For a SACK-capable TCP, a SACK message specifying ranges of lost TCP segments would also qualify as a single congestion signal. While a time-out is effectively also a congestion signal, this equation is obviously not applicable to time-outs.

When a host has no further data to send, it sends a TCP segment bearing a set FIN bit (a "FIN segment"), as in step 909. The peer (i.e., destination host) responds with an acknowledgement (a TCP segment with a set ACK bit), per step 911. At this point, the connection is "half-closed," meaning the source host will send no more data to the destination host; however, the destination host may send data to the source host. When the destination host is done sending data, the mirror-image exchange occurs: the destination host, as in step 913, sends a FIN segment to the source host. Next, in step 915, the source host returns an acknowledgement. In practice, the two FIN-ACK exchanges (steps 909–915) occur shortly after the other; and no data is sent after the first half-close.

There are two concerns relating to reliability of TCP. The first is that TCP in the end-hosts may abort transactions unnecessarily, because seemingly too many time-outs have occurred. The second is that in a spoofed environment, the end-host may mistakenly believe that the packet have been reliably transferred, when in fact the packet was never delivered.

This concern arises from generic TCP behavior, and it is addressed by spoofing. In general, TCP counts the number of time-outs that occur (or measures the length of a retransmission period). In RFC 1122, there is a requirement for TCP to report a "down link" after a threshold number of time-outs is exceeded, and to tear down the connection when a second threshold is passed. These thresholds are settable by the application. (In addition, the application may also set a USER TIME-OUT.) If a TCP connection is carried unspoofed over the satellite system 100, this mechanism in an end-host TCP may abort a connection during a space link outage. However, if spoofing is applied, then a link outage will cause the spoofer 703 to advertise a TCP window size of zero to the end-host TCP. In this case, the end-host will not be able to send data, but it will receive responses from the spoofer 703. The end-host TCP will accordingly not abort the connection. Hence, when the space link is restored, and the spoofer 703 re-opens the advertised TCP window, data transport will resume rapidly.

The second concern is introduced by spoofing itself. This concern pertains to a case where an application has completed passing data to TCP and calls a close() function to close the TCP connection. Because the application and the TCP protocol are at different layers in the protocol stack, the only way an application can know that the data it sent has been reliably delivered, as opposed to being buffered in the operating system awaiting an acknowledgement, is the return from the close(), which cannot occur until the FIN has been acknowledged. It should be noted that this may be operating system dependent; "lingering" on the close() may be optional. Thus, upon returning from the close(), an application can trust that the data has been reliably delivered. With spoofing, however, the host will receive acknowledgements for data before that data is actually reliably delivered to the destination. Under some conditions, such as rain fade or ST reset, that data may be lost without the knowledge of the application. Hence it is desirable that the sender not close the TCP connection believing all data to have been delivered, when indeed this may not be true. To address the second concern, FIN segments is not acknowledged by the spoofer 703. Instead, the spoofer 703 waits for the far-end host to acknowledge the FIN.

Figure 10:
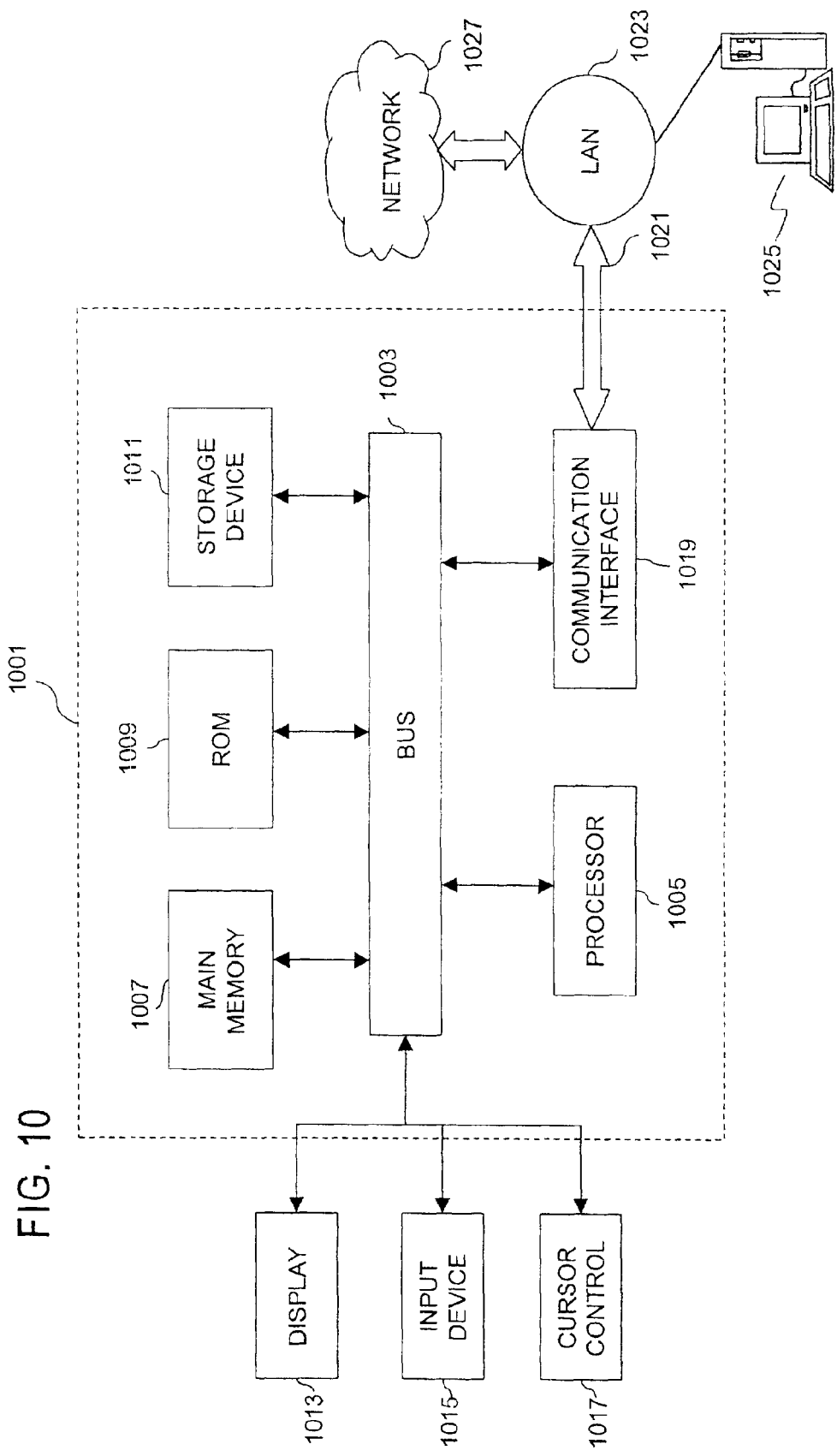
FIG. 10 is a diagram of a computer system that can perform the capacity allocations, in accordance with an embodiment of the present invention.

FIG. 10 illustrates a computer system 1001 upon which an embodiment according to the present invention may be implemented to perform the queue management, scheduling, and queue servicing functions. Computer system 1001 includes a bus 1003 or other communication mechanism for communicating information, and a processor 1005 coupled with bus 1003 for processing the information. Computer system 1001 also includes a main memory 1007, such as a random access memory (RAM) or other dynamic storage device, coupled to bus 1003 for storing information and instructions to be executed by processor 1005. In addition, main memory 1007 may be used for storing temporary variables or other intermediate information during execution of instructions to be executed by processor 1005. Computer system 1001 further includes a read only memory (ROM) 1009 or other static storage device coupled to bus 1003 for storing static information and instructions for processor 1005. A storage device 1011, such as a magnetic disk, flash memory, or optical disk, is provided and coupled to bus 1003 for storing information and instructions.

Computer system 1001 may be coupled via bus 1003 to a display 1013, such as a cathode ray tube (CRT), for displaying information to a computer user. An input device 1015, including alphanumeric and other keys, is coupled to bus 1003 for communicating information and command selections to processor 1005. Another type of user input device is cursor control 1017, such as a mouse, a trackball, or cursor direction keys for communicating direction information and command selections to processor 1005 and for controlling cursor movement on display 1013.

According to one embodiment, the steps of FIG. 8 are provided by computer system 1001 in response to processor 1005 executing one or more sequences of one or more instructions contained in main memory 1007. Such instructions may be read into main memory 1007 from another computer-readable medium, such as storage device 1011. Execution of the sequences of instructions contained in main memory 1007 causes processor 1005 to perform the process steps described herein. One or more processors in a multiprocessing arrangement may also be employed to execute the sequences of instructions contained in main memory 1007. In alternative embodiments, hard-wired circuitry may be used in place of or in combination with software instructions. Thus, embodiments are not limited to any specific combination of hardware circuitry and software.

Further, the queue management, scheduling, and queue servicing processes of the present invention may reside on a computer-readable medium. The term "computer-readable medium" as used herein refers to any medium that participates in providing instructions to processor 1005 for execution. Such a medium may take many forms, including but not limited to, non-volatile media, volatile media, and transmission media. Non-volatile media includes, for example, optical or magnetic disks, such as storage device 1011.

Volatile media includes dynamic memory, such as main memory 1007. Transmission media includes coaxial cables, copper wire and fiber optics, including the wires that comprise bus 1003. Transmission media can also take the form of acoustic or light waves, such as those generated during radio wave and infrared data communication.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1005 for execution. For example, the instructions may initially be carried on a magnetic disk of a remote computer. The remote computer can load the instructions relating to the classification process to control call processing remotely into its dynamic memory and send the instructions over a telephone line using a modem. A modem local to computer system 1001 can receive the data on the telephone line and use an infrared transmitter to convert the data to an infrared signal. An infrared detector coupled to bus 1003 can receive the data carried in the infrared signal and place the data on bus 1003. Bus 1003 carries the data to main memory 1007, from which processor 1005 retrieves and executes the instructions. The instructions received by main memory 1007 may optionally be stored on storage device 1011 either before or after execution by processor 1005.

Computer system 1001 also includes a communication interface 1019 coupled to bus 1003. Communication interface 1019 provides a two-way data communication coupling to a network link 1021 that is connected to a local network 1023. For example, communication interface 1019 may be a network interface card to attach to any packet switched local area network (LAN); e.g., a Universal Serial Bus (USB). As another example, communication interface 1019 may be an asymmetrical digital subscriber line (ADSL) card, an integrated services digital network (ISDN) card or a modem to provide a data communication connection to a corresponding type of telephone line. Wireless links may also be implemented. In any such implementation, communication interface 1019 sends and receives electrical, electromagnetic or optical signals that carry digital data streams representing various types of information.

Network link 1021 typically provides data communication through one or more networks to other data devices. For example, network link 1021 may provide a connection through local network 1023 to a host computer 1025 or to data equipment operated by a service provider, which provides data communication services through a communication network 1027 (e.g., the Internet). LAN 1023 and network 1027 both use electrical, electromagnetic or optical signals that carry digital data streams. The signals through the various networks and the signals on network link 1021 and through communication interface 1019, which carry the digital data to and from computer system 1001, are exemplary forms of carrier waves transporting the information. Computer system 1001 can transmit notifications and receive data, including program code, through the network(s), network link 1021 and communication interface 1019.

The techniques described herein provide several advantages over prior approaches to scheduling and servicing of packets within a terminal 300 used in a satellite communications system, particularly with respect to web traffic. The satellite terminal 300 that contains a classification logic 701 and a spoofer 703. The terminal 300 includes a plurality of prioritized queues that are configured to store packets from a multiple end user hosts. The packets conform with a predetermined protocol; e.g., a protocol at the transport layer. The classification logic 701 classifies the packets based upon the predetermined protocol, such as TCP. A packet is selectively stored in one of the plurality of queues, wherein the one queue is of a relatively high priority. The packet is scheduled for transmission over the satellite communications network according to the relative priority of the one queue. This arrangement advantageously permits an identified message flow to be given expedited treatment, thereby reducing user response time.

Obviously, numerous modifications and variations of the present invention are possible in light of the above teachings. It is therefore to be understood that within the scope of the appended claims, the invention may be practiced otherwise than as specifically described herein.

What is claimed is:

1. A method of transmitting packets via a terminal over a satellite communications network, the method comprising:

receiving a packet that conforms with a predetermined protocol;

classifying the packet based upon the predetermined protocol;

selectively storing the packet into one of a plurality of prioritized queues, the one queue being of a relatively high priority, wherein the queues correspond to user services that include a connection-oriented service and a connectionless service, and further wherein the plurality of queues in the trasmitting step is prioritized using a weighting scheme that is based upon user services; and scheduling the packet for transmission over the satellite communications network according to the storing step.

2. The method according to claim 1, wherein the predetermined protocol is a transport layer protocol, the method further comprising:

determining whether the packet corresponds to an initial message in a message flow; and selectively compressing the packet to reduce header information in response to the determining step.

3. The method according to claim 2, wherein the transport layer protocol is TCP (Transmission Control Protocol), the message flow in the determining step includes Hyper Text Transfer Protocol (HTTP) messages.

4. The method according to claim 1, further comprising:

transmitting the packet over a contention channel of the satellite communications network.

5. The method according to claim 1, further comprising:

storing header information associated with the packet at a remote terminal.

6. The method according to claim 1, further comprising:

determining whether a threshold of the one queue has been exceeded; and redirecting the packet to another one of the priority queues, the one queue being of a higher priority than the other queue.

7. The method according to claim 1, further comprising:

servicing the plurality of queues according to a schedule plan to selectively forward the packet to an uplink channel of the satellite communications network.

8. The method according to claim 1, further comprising:
spoofing a source host in response to the receiving step, the source host originating the packet.

9. A method of trasmitting packets via a terminal over a satellite communications network, the method comprising:
receiving a packet that conforms with a predetermined protocol including a transport layer protocol that is TCP (Transmission Control Protocol);
classifying the packet based upon the predetermined protocol;
selectively storing the packet into one of a plurality of prioritized queues, the one queue being of a relatively high priority;
determining whether the packet corresponds to an initial message in a message flow that includes Hyper Text Transfer Protocol (HTTP) messages,
wherein the HTTP messages include GET messages;
selectively compressing the packet to reduce header information in response to the determining step; and
scheduling the packet for transmission over the satellite communications network according to the storing step.

10. A method of trasmitting packets via a terminal over a satellite communications network, the method comprising:
receiving a packet that conforms with a predetermined protocol including a transport layer protocol;
classifying the packet based upon the predetermined protocol;
selectively storing the packet into one of a plurality of prioritized queues, the one queue being of a relatively high priority;
determining whether the packet corresponds to an initial message in a message flow;
selectively compressing the packet to reduce header information in response to the determining step by
eliminating repeated header information from the packet; and
scheduling the packet for transmission over the satellite communications network according to the storing step.

11. A method of transmitting packets via a terminal over a satellite communications network, the method comprising:
receiving a packet that conforms with a predetermined protocol;
classifying the packet based upon the predetermined protocol;
selectively storing the packet into one of a plurality of prioritized queues, the one queue being of a relatively high priority;
scheduling the packet for transmission over the satellite communications network according to the storing step;
servicing the plurality of queues according to a schedule plan to selectively forward the packet to an uplink channel of the satellite communications network;
allocating a packet transmission opportunity (PTO) via the schedule plan; and
selectively preempting the PTO.

12. A terminal apparatus for transmitting packets to a satellite communications system, comprising:
a plurality of queues configured to store the packets, the plurality of queues being prioritized, wherein the packets conform with a predetermined protocol and the queues correspond to user services that include a connection-oriented service and a connectionless service, and further wherein the plurality of queues in the transmitting step is prioritized using a weighting scheme that is based upon user services; and
classification logic configured to classify the packets based upon the predetermined protocol, wherein one of the packets is selectively stored in one of the plurality of queues, the one queue being of a relatively high priority, the one packet being scheduled for transmission over the satellite communications network according to the relative priority of the one queue.

13. The apparatus according to claim 12, wherein the one packet is transmitted over a contention channel of the satellite communications network.

14. The apparatus according to claim 12, wherein the header information associated with the one packet is stored at a remote terminal.

15. The apparatus according to claim 12, wherein the one packet is redirected to another one of the priority queues if a threshold of the one queue has been exceeded, the one queue being of a higher priority than the other queue.

16. The apparatus according to claim 12, wherein the plurality of queues are serviced according to a schedule plan, the packet being forwarded to an uplink channel of the satellite communications network.

17. The apparatus according to claim 12, further comprising:
a spoofer configured to transmit an acknowledgement message to a source host that originated the one packet.

18. A terminal apparatus for transmitting packets to a satellite communications system, comprising:
a plurality of queues configured to store the packets, the plurality of queues being prioritized, wherein the packets conform with a predetermined protocol including a transport layer protocol;
classification logic configured to classify the packets based upon the predetermined protocol, wherein one of the packets is selectively stored in one of the plurality of queues, the one queue being of a relatively high priority, the one packet being scheduled for transmission over the satellite communications network according to the relative priority of the one queue; and
a spoofer coupled to the classification logic and configured to selectively compress the one packet to reduce header information based upon determining whether the one packet corresponds to an initial message in a message flow.

19. The apparatus according to claim 18, wherein the transport layer protocol is TCP (Transmission Control Protocol), the message flow includes Hyper Text Transfer Protocol (HTTP) messages.

20. The apparatus according to claim 19, wherein the HTTP messages include GET messages.

21. The apparatus according to claim 18, wherein the spoofer compresses the one packet by eliminating repeated header information from the one packet.

22. A terminal apparatus for transmitting packets to a satellite communications system, comprising:
a plurality of queues configured to store the packets, the plurality of queues being prioritized, wherein the packets conform with a predetermined protocol including a transport layer protocol, and the queues are serviced according to a schedule plan; and
classification logic configured to classify the packets based upon the predetermined protocol, wherein one of the packets is selectively stored in one of the plurality of queues, the one queue being of a relatively high priority, the one packet being scheduled for transmission over an uplink channel of the satellite communications network according to the relative priority of the one queue, wherein the schedule plan provides for allocation of a packet transmission opportunity (PTO), the PTO being selectively preempted.

23. A satellite communications system comprising:
a hub configured to control bandwidth allocations in conjunction with a satellite; and
a plurality of terminals configured to transmit packets, each of the terminals comprising,
a plurality of queues configured to store the packets, the plurality of queues being prioritized, wherein the queues correspond to user services that include a connection-oriented service and a connectionless service, and
classification logic configured to classify the packets based upon a predetermined protocol associated with the packets, wherein one of the packets is selectively stored in one of the plurality of queues, the one queue being of a relatively high priority, the one packet being scheduled for transmission over the satellite communications network according to the relative priority of the one queue.

24. The system according to claim 23, wherein the one packet is transmitted over a contention channel of the satellite communications network.

25. The system according to claim 23, wherein the plurality of terminals includes a source terminal and a destination terminal, the header information associated with the one packet being stored at the destination terminal.

26. The system according to claim 23, wherein the one packet is redirected to another one of the priority queues if a threshold of the one queue has been exceeded, the one queue being of a higher priority than the other queue.

27. The system according to claim 23, wherein the plurality of queues are prioritized using a weighting scheme that is based upon user services.

28. The system according to claim 23, wherein the plurality of queues are serviced according to a schedule plan, the one packet being forwarded to an uplink channel of the satellite communications network.

29. A satellite communications system comprising:
a hub configured to control bandwidth allocations in conjunction with a satellite; and
a plurality of terminals configured to transmit packets, each of the terminals comprising,
a plurality of queues configured to store the packets, the plurality of queues being prioritized,
classification logic configured to classify the packets based upon a predetermined protocol associated with the packets, the predetermined protocol including a transport layer protocol, wherein one of the packets is selectively stored in one of the plurality of queues, the one queue being of a relatively high priority, the one packet being scheduled for transmission over the satellite communications network according to the relative priority of the one queue, and
a spoofer coupled to the classification logic and configured to selectively compress the one packet to reduce header information based upon determining whether the one packet corresponds to an initial message in a message flow.

30. The system according to claim 29, wherein the transport layer protocol is TCP (Transmission Control Protocol), the message flow includes Hyper Text Transfer Protocol (HTTP) messages.

31. The system according to claim 30, wherein the HTTP messages include GET messages.

32. The system according to claim 29, wherein the spoofer compresses the one packet by eliminating repeated header information from the one packet.

33. A satellite communications system comprising:
a hub configured to control bandwidth allocations in conjunction with a satellite; and
a plurality of terminals configured to transmit packets, each of the terminals comprising,
a plurality of queues configured to store the packets, the plurality of queues being prioritized, and serviced according to a schedule plan,
classification logic configured to classify the packets based upon a predetermined protocol associated with the packets, wherein one of the packets is selectively stored in one of the plurality of queues, the one queue being of a relatively high priority, the one packet being scheduled for transmission over an uplink channel of the satellite communications network according to the relative priority of the one queue, wherein the schedule plan provides for allocation of a packet transmission opportunity (PTO), the PTO being selectively preempted.

34. A terminal apparatus for transmitting packets to a satellite communications system, comprising:
means for receiving a packet that conforms with a predetermined protocol;
means for classifying the packet based upon the predetermined protocol;
means for selectively storing the packet into one of a plurality of prioritized queues, the one queue being of a relatively high priority, wherein the queues correspond to user services that include a connection-oriented service and a connectionless service, and further wherein the plurality of queues in the trasmitting step is prioritized using a weighting scheme that is based upon user services; and
means for scheduling the packet for transmission over the satellite communications network according to priority level of the one queue.

35. The apparatus according to claim 34, wherein the predetermined protocol is a transport layer protocol, the apparatus further comprising:
means for determining whether the packet corresponds to an initial message in a message flow; and
means for compressing the packet to reduce header information if the packet corresponds to the initial message.

36. The apparatus according to claim 35, wherein the transport layer protocol is TCP (Transmission Control Protocol), the message flow includes Hyper Text Transfer Protocol (HTTP) messages.

37. The apparatus according to claim 34, further comprising:
means for transmitting the packet over a contention channel of the satellite communications network.

38. The apparatus according to claim 34, further comprising:
means for storing header information associated with the packet at a remote terminal.

39. The apparatus according to claim 34, further comprising:
means for determining whether a threshold of the one queue has been exceeded; and means for redirecting the packet to another one of the priority queues, the one queue being of a higher priority than the other queue.

40. The apparatus according to claim 34, further comprising:
means for servicing the plurality of queues according to a schedule plan to selectively forward the packet to an uplink channel of the satellite communications network.

41. A terminal apparatus for transmitting packets to a satellite communications system, comprising:
means for receiving a packet that conforms with a predetermined protocol;
means for classifying the packet based upon the predetermined protocol;
means for selectively storing the packet into one of a plurality of prioritized queues, the one queue being of a relatively high priority;
means for servicing the plurality of queues according to a schedule plan to selectively forward the packet to an uplink channel of the satellite communications network;
means for allocating a packet transmission opportunity (PTO) via the schedule plan; and
means for selectively preempting the PTO; and
means for scheduling the packet for transmission over the satellite communications network according to priority level of the one queue.

42. A terminal apparatus for transmitting packets to a satellite communications system, comprising:
means for receiving a packet that conforms with a predetermined protocol including a transport layer protocol that is TCP (Transmission Control Protocol);
means for classifying the packet based upon the predetermined protocol;
means for selectively storing the packet into one of a plurality of prioritized queues, the one queue being of a relatively high priority;
means for determining whether the packet corresponds to an initial message in a message flow including Hyper Text Transfer Protocol (HTTP) messages that include GET messages;
means for compressing the packet to reduce header information if the packet corresponds to the initial message; and
means for scheduling the packet for transmission over the satellite communications network according to priority level of the one queue.

43. A terminal apparatus for transmitting packets to a satellite communications system, comprising:
means for receiving a packet that conforms with a predetermined protocol including a transport layer protocol;
means for classifying the packet based upon the predetermined protocol;
means for selectively storing the packet into one of a plurality of prioritized queues, the one queue being of a relatively high priority;
means for determining whether the packet corresponds to an initial message in a message flow;
means for compressing the packet to reduce header information if the packet corresponds to the initial message by eliminating repeated header information from the packet; and means for scheduling the packet for transmission over the satellite communications network according to priority level of the one queue.

44. The apparatus according to claim 34, further comprising:
means for spoofing a source host in response to the receiving step, the source host originating the packet.

45. A computer-readable medium carrying one or more sequences of one or more instructions for transmitting packets via a terminal over a satellite communications network, the one or more sequences of one or more instructions including instructions which, when executed by one or more processors, cause the one or more processors to perform the steps of:
receiving a packet that conforms with a predetermined protocol;
classifying the packet based upon the predetermined protocol;
selectively storing the packet into one of a plurality of prioritized queues, the one queue being of a relatively high priority, wherein the queues correspond to user services that include a connection-oriented service and a connectionless service, and further wherein the plurality of queues in the transmitting step is prioritized using a weighting scheme that is based upon user services; and
scheduling the packet for transmission over the satellite communications network according to the storing step.

46. The computer-readable medium according to claim 45, wherein the predetermined protocol is a transport layer protocol, the computer-readable medium further comprising:
determining whether the packet corresponds to an initial message in a message flow; and
selectively compressing the packet to reduce header information in response to the determining step.

47. The computer-readable medium according to claim 46, wherein the transport layer protocol is TCP (Transmission Control Protocol), the message flow in the determining step includes Hyper Text Transfer Protocol (HTTP) messages.

48. The computer-readable medium according to claim 45, wherein the one or more processors further perform the step of:
transmitting the packet over a contention channel of the satellite communications network.

49. The computer-readable medium according to claim 45, wherein the one or more processors further perform the step of:
storing header information associated with the packet at a remote terminal.

50. The computer-readable medium according to claim 45, wherein the one or more processors further perform the steps of:
determining whether a threshold of the one queue has been exceeded; and
redirecting the packet to another one of the priority queues, the one queue being of a higher priority than the other queue.

51. The computer-readable medium according to claim 45, wherein the one or more processors further perform the step of:
servicing the plurality of queues according to a schedule plan to selectively forward the packet to an uplink channel of the satellite communications network.

52. The computer-readable medium according to claim 45, wherein the one or more processors further perform the step of:

spoofing a source host in response to the receiving step, the source host originating the packet.

53. A computer-readable medium carrying one or more sequences of one or more instructions for transmitting packets via a terminal over a satellite communications network, the one or more sequences of one or more instructions including instructions which, when executed by one or more processors, cause the one or more processors to perform the steps of:

receiving a packet that conforms with a predetermined protocol including a transport layer protocol that is TCP (Transmission Control Protocol);

classifying the packet based upon the predetermined protocol;

selectively storing the packet into one of a plurality of prioritized queues, the one queue being of a relatively high priority;

determining whether the packet corresponds to an initial message in a message flow that includes Hyper Text Transfer Protocol (HTTP) messages that include GET messages; and scheduling the packet for transmission over the satellite communications network according to the storing step.

54. A computer-readable medium carrying one or more sequences of one or more instructions for transmitting packets via a terminal over a satellite communications network, the one or more sequences of one or more instructions including instructions which, when executed by one or more processors, cause the one or more processors to perform the steps of:

receiving a packet that conforms with a predetermined protocol including a transport layer protocol;

classifying the packet based upon the predetermined protocol;

selectively storing the packet into one of a plurality of prioritized queues, the one queue being of a relatively high priority;

determining whether the packet corresponds to an initial message in a message flow;

selectively compressing the packet to reduce header information in response to the determining step by eliminating repeated header information from the packet; and scheduling the packet for transmission over the satellite communications network according to the storing step.

55. A computer-readable medium carrying one or more sequences of one or more instructions for transmitting packets via a terminal over a satellite communications network, the one or more sequences of one or more instructions including instructions which, when executed by one or more processors, cause the one or more processors to perform the steps of:

receiving a packet that conforms with a predetermined protocol;

classifying the packet based upon the predetermined protocol;

selectively storing the packet into one of a plurality of prioritized queues, the one queue being of a relatively high priority;

servicing the plurality of queues according to a schedule plan to selectively forward the packet to an uplink channel of the satellite communications network;

allocating a packet transmission opportunity (PTO) via the schedule plan; and selectively preempting the PTO.

* * * * *